(12) United States Patent
Ko

(10) Patent No.: US 11,856,618 B2
(45) Date of Patent: *Dec. 26, 2023

(54) METHOD FOR TRANSMITTING AND RECEIVING SIGNAL IN WIRELESS COMMUNICATION SYSTEM, AND DEVICE SUPPORTING SAME

(71) Applicant: LG ELECTRONICS INC., Seoul (KR)

(72) Inventor: Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,813

(22) Filed: Jul. 13, 2023

(65) Prior Publication Data

US 2023/0363015 A1 Nov. 9, 2023

Related U.S. Application Data

(63) Continuation of application No. 17/711,934, filed on Apr. 1, 2022, now Pat. No. 11,729,837, which is a
(Continued)

(51) Int. Cl.
*H04W 74/08* (2009.01)
*H04L 5/00* (2006.01)
(Continued)

(52) U.S. Cl.
CPC ...... *H04W 74/0841* (2013.01); *H04B 7/0811* (2013.01); *H04L 5/0051* (2013.01);
(Continued)

(58) Field of Classification Search
CPC .......... H04W 36/00725; H04W 74/00; H04W 74/08; H04W 74/0833
See application file for complete search history.

(56) References Cited

U.S. PATENT DOCUMENTS 11,729,837 B2 * 8/2023 Ko ............... H04J 13/0077
370/329
2019/0342874 A1 * 11/2019 Davydov ............. H04W 72/23
(Continued)

FOREIGN PATENT DOCUMENTS

WO   WO-2020068596 A1 * 4/2020 ........ H04W 74/0833

*Primary Examiner* — Salvador E Rivas
(74) *Attorney, Agent, or Firm* — BRYAN CAVE LEIGHTON PAISNER LLP

(57) ABSTRACT

The present disclosure relates to a method carried out by a terminal in a wireless communication system, and a device supporting same, and more specifically relates to a method comprising a step of obtaining a message A comprising a physical uplink shared channel (PUSCH) and a physical random access channel (PRACH) preamble, and a step of transmitting the message A, wherein the PUSCH is transmitted on the basis of information related to a PUSCH configuration for the message A that is being received, and, on the basis of the information relating to the PUSCH configuration comprising information relating to the instruction of a code division multiplexing (CDM) group for a demodulation reference signal (DM-RS) for the PUSCH, the CDM group is set to be a group indicated by information relating to the indication of the CDM group among two pre-set groups. The present disclosure also relates to a device supporting same.

16 Claims, 32 Drawing Sheets

Related U.S. Application Data continuation of application No. PCT/KR2020/013475, filed on Oct. 5, 2020.

(60) Provisional application No. 62/933,229, filed on Nov. 8, 2019, provisional application No. 62/911,120, filed on Oct. 4, 2019.

(51) Int. Cl.
*H04W 72/0446* (2023.01)
*H04W 74/00* (2009.01)
*H04B 7/08* (2006.01)
*H04L 27/26* (2006.01)
*H04L 12/413* (2006.01)
*H04W 36/00* (2009.01)

(52) U.S. Cl.
CPC ........ *H04L 12/413* (2013.01); *H04L 27/2692* (2013.01); *H04W 72/0446* (2013.01); *H04W 74/002* (2013.01); *H04W 74/08* (2013.01); *H04W 74/0833* (2013.01); *H04W 74/0866* (2013.01); *H04W 36/00725* (2023.05)

(56) References Cited

U.S. PATENT DOCUMENTS

2020/0314917 A1\* 10/2020 Jeon ..................... H04W 74/08
2021/0051707 A1\* 2/2021 Rastegardoost ...... H04L 5/0051
2022/0183071 A1\* 6/2022 Liu ................... H04W 72/1268

\* cited by examiner (a)

Slot level time multiplexing

METHOD FOR TRANSMITTING AND RECEIVING SIGNAL IN WIRELESS COMMUNICATION SYSTEM, AND DEVICE SUPPORTING SAME

This application is a continuation application of U.S. patent application Ser. No. 17/711,934, filed on Apr. 1, 2022, which is a Continuation Application of International Application No. PCT/KR2020/013475, filed on Oct. 5, 2020, which claims the benefit of and priority to U.S. Provisional Application No. 62/911,120, filed on Oct. 4, 2019 and U.S. Provisional Application No. 62/933,229, filed on Nov. 8, 2019, the contents of which are all hereby incorporated by reference herein in their entirety.

TECHNICAL FIELD

Embodiments of the present disclosure relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Various embodiments may provide a method of transmitting and receiving a signal in a wireless communication system and apparatus for supporting the same.

Various embodiments may provide a method for a 2-step random access channel (RACH) procedure in a wireless communication system and apparatus for supporting the same.

Various embodiments may provide a method of configuring a message A physical uplink shared channel (PUSCH) demodulation reference signal (DMRS) in a wireless communication system and apparatus for supporting the same.

Various embodiments may provide a method of mapping a preamble to a PUSCH occasion in a wireless communication system and apparatus for supporting the same.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

Various embodiments may provide a method of transmitting and receiving a signal in a wireless communication system and apparatus for supporting the same.

According to various embodiments, a method performed by a user equipment (UE) in a wireless communication system may be provided.

According to various embodiments, the method may include: obtaining a message A including a physical random access channel (PRACH) preamble and a physical uplink shared channel (PUSCH); and transmitting the message A.

According to various embodiments, the PUSCH may be transmitted based on received information related to a PUSCH configuration for the message A.

According to various embodiments, based on that the information related to the PUSCH configuration includes information related to indication of a code division multiplexing (CDM) group for a demodulation reference signal (DMRS) for the PUSCH, the CDM group may be configured as a group indicated by the information related to the indication of the CDM group of two predetermined groups.

According to various embodiments, based on that the information related to the PUSCH configuration does not include the information related to the indication of the CDM group, the CDM group may be configured as the two predetermined groups.

According to various embodiments, a number of ports for the DMRS may be determined in a set of $\{1, 2, 4\}$.

According to various embodiments, based on that transform precoding for the PUSCH is disabled: two different identifiers (IDs) related to identifying a sequence for initialization of a pseudo-random sequence generator related to sequence generation of the DMRS may be obtained based on two different higher layer parameters, respectively.

According to various embodiments, a scrambling ID (SCID) related to identifying indices of the two different IDs may be determined based on the PRACH preamble.

According to various embodiments, based on the transform precoding is enabled, one ID related to identifying the sequence for the initialization of the pseudo-random sequence generator may be obtained based on a higher layer parameter.

According to various embodiments, the PRACH preamble may be obtained from among a plurality of PRACH preambles, and According to various embodiments, the SCID may be determined based on mapping between the plurality of preambles and a PUSCH occasion for transmitting the PUSCH.

According to various embodiments, an apparatus configured to operate in a wireless communication system may be provided.

According to various embodiments, the apparatus may include: a memory; and at least one processor connected to the memory.

According to various embodiments, the at least one processor may be configured to: obtain a message A including a PRACH preamble and a PUSCH; and transmit the message A.

According to various embodiments, the PUSCH may be transmitted based on received information related to a PUSCH configuration for the message A.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

According to various embodiments, based on that the information related to the PUSCH configuration does not include the information related to the indication of the CDM group, the CDM group may be configured as the two predetermined groups.

According to various embodiments, a number of ports for the DMRS may be determined in a set of {1, 2, 4}.

According to various embodiments, based on that transform precoding for the PUSCH is disabled: two different identifiers (IDs) related to identifying a sequence for initialization of a pseudo-random sequence generator related to sequence generation of the DMRS may be obtained based on two different higher layer parameters, respectively.

According to various embodiments, a scrambling ID (SCID) related to identifying indices of the two different IDs may be determined based on the PRACH preamble.

According to various embodiments, the apparatus may communicate with at least one of a mobile terminal, a network, or an autonomous driving vehicle other than a vehicle including the apparatus.

According to various embodiments, a method performed by a base station (BS) in a wireless communication system may be provided.

According to various embodiments, the method may include: receiving a message A; and obtaining a PRACH preamble and a PUSCH based on the message A.

According to various embodiments, the PUSCH may be obtained based on transmitted information related to a PUSCH configuration for the message A.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

According to various embodiments, an apparatus configured to operate in a wireless communication system may be provided.

According to various embodiments, the apparatus may include: a memory; and at least one processor connected to the memory.

According to various embodiments, the at least one processor may be configured to: receive a message A; and obtain a PRACH preamble and a PUSCH based on the message A.

According to various embodiments, the PUSCH may be obtained based on transmitted information related to a PUSCH configuration for the message A.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

According to various embodiments, an apparatus configured to operate in a wireless communication system may be provided.

According to various embodiments, the apparatus may include: at least one processor; obtaining a message A including a PRACH preamble and a PUSCH; and transmitting the message A.

According to various embodiments, the PUSCH may be transmitted based on received information related to a PUSCH configuration for the message A.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

According to various embodiments, a processor-readable medium configured to store one or more instructions that cause at least one processor to perform a method may be provided.

According to various embodiments, the method may include: obtaining a message A including a PRACH preamble and a PUSCH; and transmitting the message A.

According to various embodiments, the PUSCH may be transmitted based on received information related to a PUSCH configuration for the message A.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

It will be appreciated by persons skilled in the art that the objects that could be achieved with the present disclosure are not limited to what has been particularly described hereinabove and the above and other objects that the present disclosure could achieve will be more clearly understood from the following detailed description.

Advantageous Effects

According to various embodiments, signals may be effectively transmitted and received in a wireless communication system.

According to various embodiments, message A physical uplink shared channel (PUSCH) demodulation reference signal (DMRS) resources (e.g., DMRS ports/sequences, etc.) may be used efficiently According to various embodiments, preambles may be used efficiently.

It will be appreciated by persons skilled in the art that that the effects that can be achieved through the various embodiments of the present disclosure are not limited to those described above and other advantageous effects of the various embodiments of the present disclosure will be more clearly understood from the following detailed description. That is, unintended effects according to implementation of the present disclosure may be derived by those skilled in the art from the various embodiments of the present disclosure.

DESCRIPTION OF DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

FIG. 16 is a diagram illustrating an exemplary RACH occasion configuration to which various embodiments of the present disclosure are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a BS on a DL and transmits information to the BS on a UL. The information transmitted and received between the UE and the BS includes general data information and various types of control information. There are many physical channels according to the types/usages of information transmitted and received between the BS and the UE.

Figure 1:
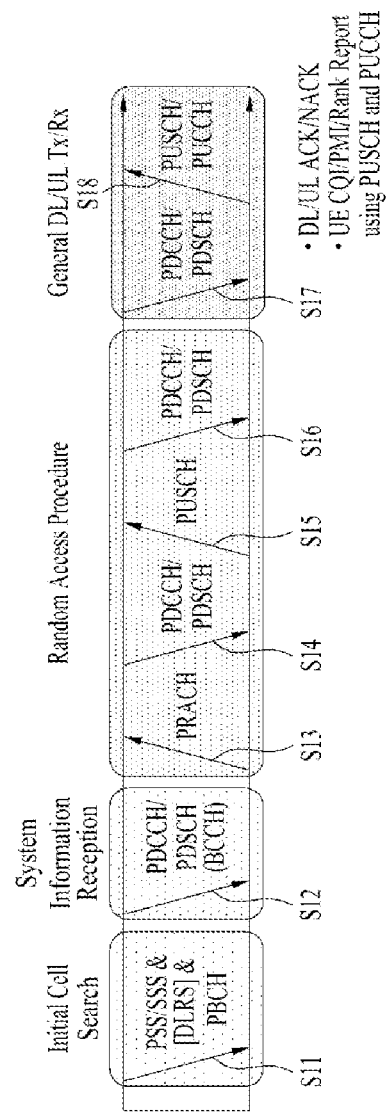
FIG. 1 is a diagram illustrating physical channels and a signal transmission method using the physical channels, which may be used in various embodiments of the present disclosure.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the BS and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the BS.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the BS, the UE may perform a random access procedure with the BS (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called UCI. The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
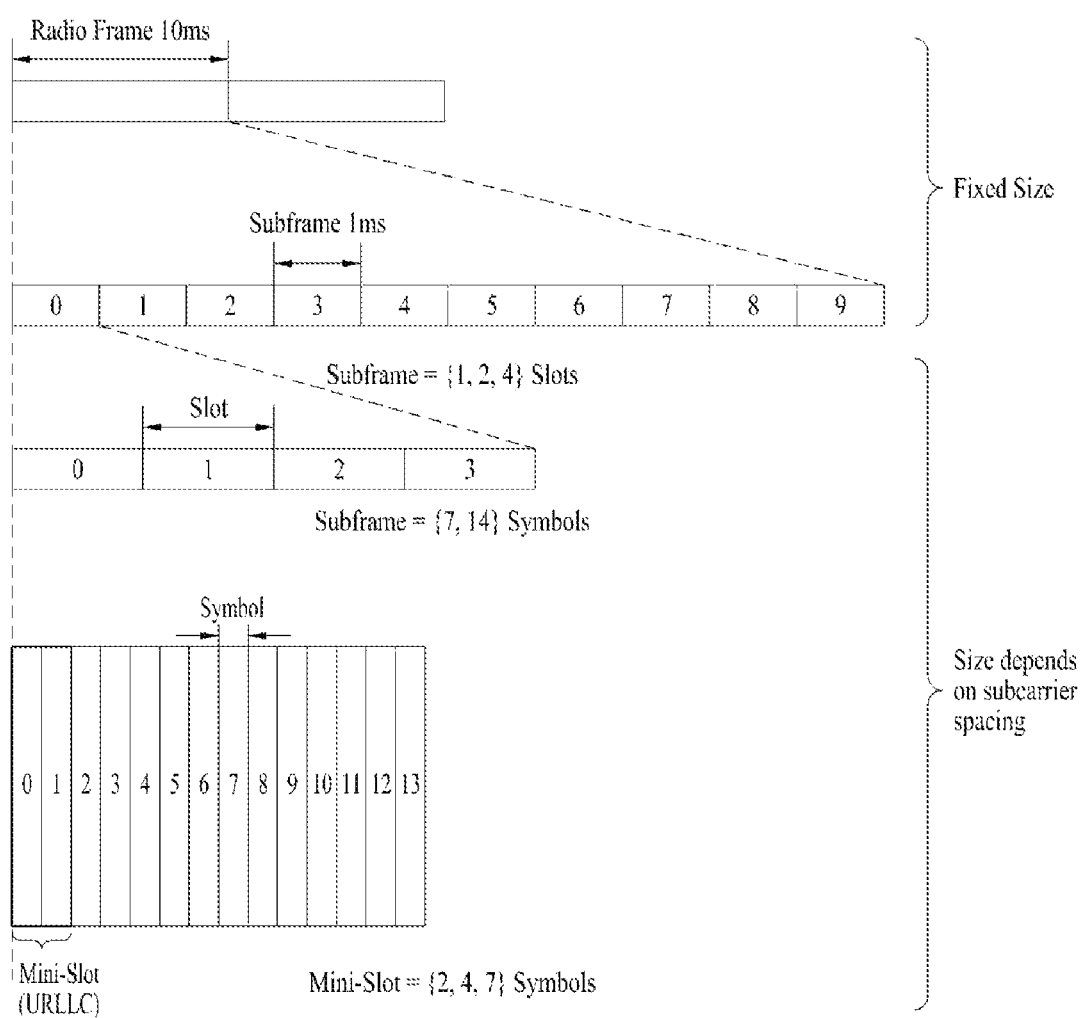
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFUM numerologies and frame structures which may be considered for the NR system. Multiple OFUM numerologies supported by the NR system may be defined as listed in Table 1. For a bandwidth part (BWP), $\mu$ and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology $\mu$, slots are numbered with $n^\mu_s \in \{0, \ldots, N^{slot,\mu}_{subframe}-1\}$ in an increasing order in a subframe, and with $n_{s,f}^\mu \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N_{symb}^{slot}$ represents the number of symbols in a slot, $N_{slot}^{frame,\mu}$ represents the number of slots in a frame, and $N_{slot}^{subframe,\mu}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
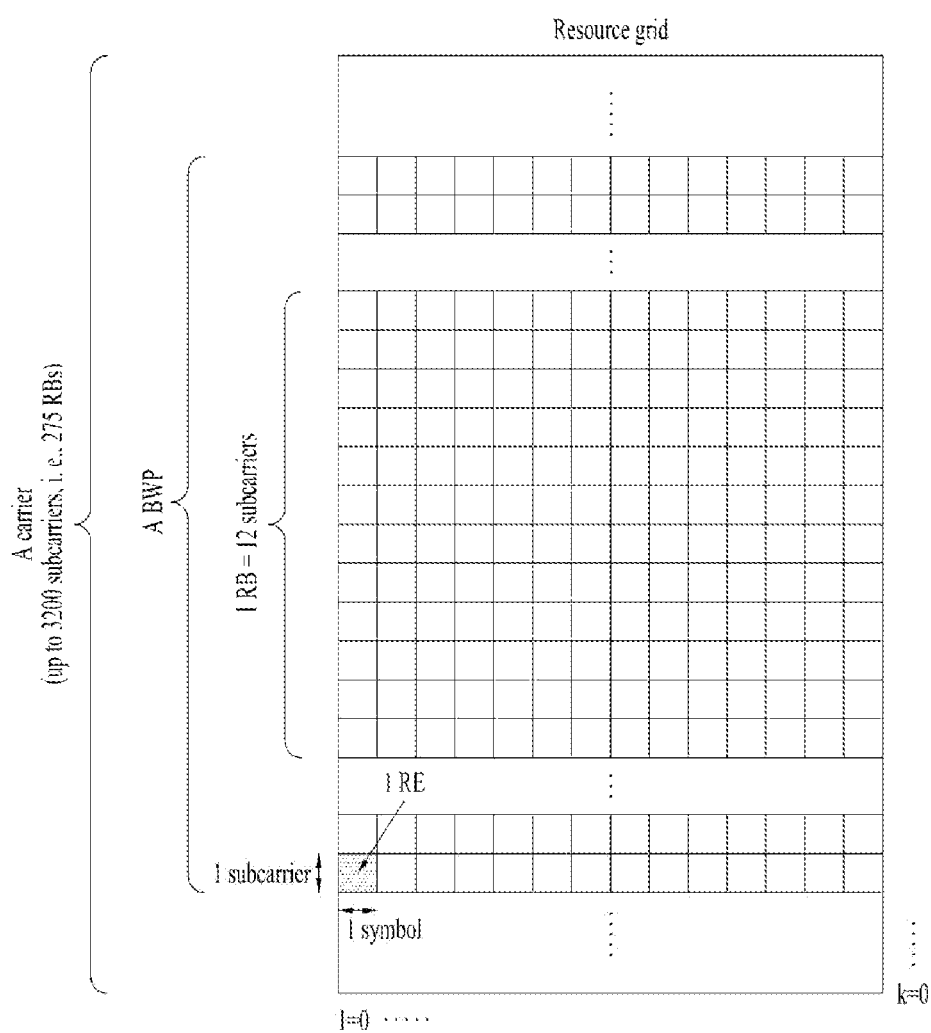
FIG. 3 is a diagram illustrating a slot structure in a new radio (NR) system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A BWP, which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
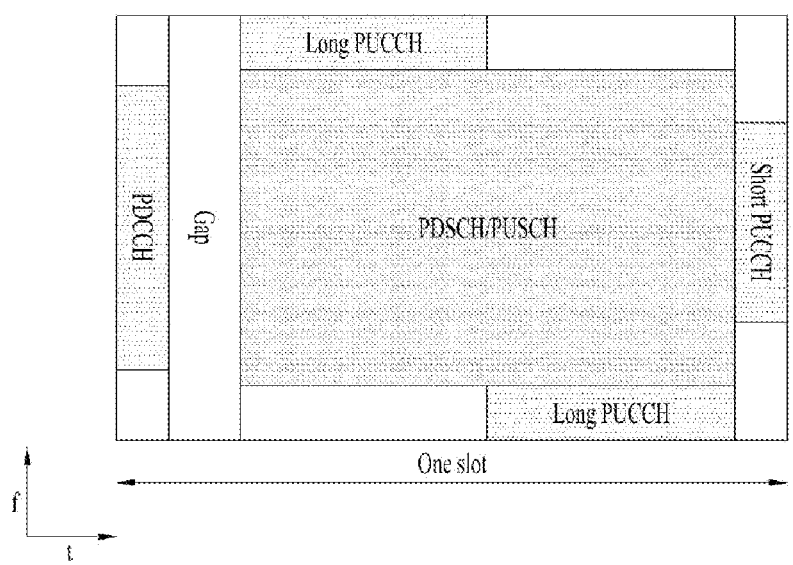
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an ACK/NACK information for DL data, channel state information (CSI), a scheduling request (SR), and so on.

The PDCCH carries DCI and is modulated in QPSK. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration.

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS- RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Bandwidth Part (BWP)

The NR system may support up to 400 MHz for each carrier. If the UE always turns on a radio frequency (RF) module for all carriers while operating on such a wideband carrier, the battery consumption of the UE may increase. Considering multiple use cases operating on one wideband carrier (e.g., enhanced mobile broadband (eMBB), ultra-reliable and low-latency communication (URLLC), massive machine type communications (mMTC), vehicle-to-everything (V2X), etc.), a different numerology (e.g., SCS) may be supported for each frequency band of the carrier. Further, considering that each UE may have a different capability regarding the maximum bandwidth, the BS may instruct the UE to operate only in a partial bandwidth rather than the whole bandwidth of the wideband carrier. The partial bandwidth is referred to as a BWP. The BWP is a subset of contiguous common RBs defined for numerology μi in BWP i of a carrier in the frequency domain, and one numerology (e.g., SCS, CP length, and/or slot/mini-slot duration) may be configured for each BWP.

The BS may configure one or more BWPs in one carrier configured to the UE. Alternatively, if UEs are concentrated in a specific BWP, the BS may move some UEs to another BWP for load balancing. For frequency-domain inter-cell interference cancellation between neighboring cells, the BS may configure BWPs on both sides of a cell except for some central spectra in the whole bandwidth within the same slot. That is, the BS may configure at least one DL/UL BWP for the UE associated with a wideband carrier, activate at least one DL/UL BWP among DL/UL BWP(s) configured at a specific time (by L1 signaling which is a physical-layer control signal, a MAC control element (CE) which is a MAC-layer control signal, or RRC signaling), and instruct the UE to switch to another configured DL/UL BWP (by L1 signaling, a MAC CE, or RRC signaling). Alternatively, the BS may configure a timer and switch the UE to a predetermined DL/UL BWP upon expiration of the timer. In particular, an activated DL/UL BWP is referred to as an active DL/UL BWP. While performing initial access or before setting up an RRC connection, the UE may not receive any DL/UL BWP configurations. A DL/UL BWP that the UE assumes in this situation is referred to as an initial active DL/UL BWP.

1.5. Synchronization Signal Block (SSB) Transmission and Related Operation

Figure 5:
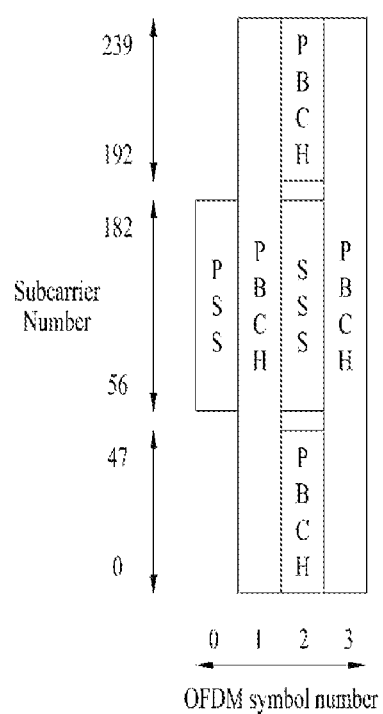
FIG. 5 is a diagram illustrating the structure of a synchronization signal block (SSB) to which various embodiments of the present disclosure are applicable.

FIG. 5 is a diagram illustrating the structure of a synchronization signal block (SSB) to which various embodiments of the present disclosure are applicable.

A UE may perform cell search, system information acquisition, beam alignment for initial access, DL measurement, and so on based on an SSB. The term SSB is interchangeably used with synchronization signal/physical broadcast channel (SS/PBCH) block.

Referring to FIG. 5, the SSB to which various embodiments of the present disclosure are applicable may include 20 RBs in four consecutive OFDM symbols. Further, the SSB may include a PSS, an SSS, and a PBCH, and the UE may perform cell search, system information acquisition, beam alignment for initial access, DL measurement, and so on based on the SSB.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Cell Search

Cell search refers to a procedure in which the UE acquires time/frequency synchronization of a cell and detects a cell ID (e.g., physical layer cell ID (PCID)) of the cell. The PSS may be used to detect a cell ID within a cell ID group, and the SSS may be used to detect the cell ID group. The PBCH may be used in detecting an SSB (time) index and a half-frame.

The cell search procedure of the UE may be summarized as described in Table 8 below.

TABLE 8

| Type of Signals | | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/Search space configuration |
| $5^{th}$ Step | PDCCH and PDSCH | Cell access information RACH configuration |

There are 336 cell ID groups each including three cell IDs. There are 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
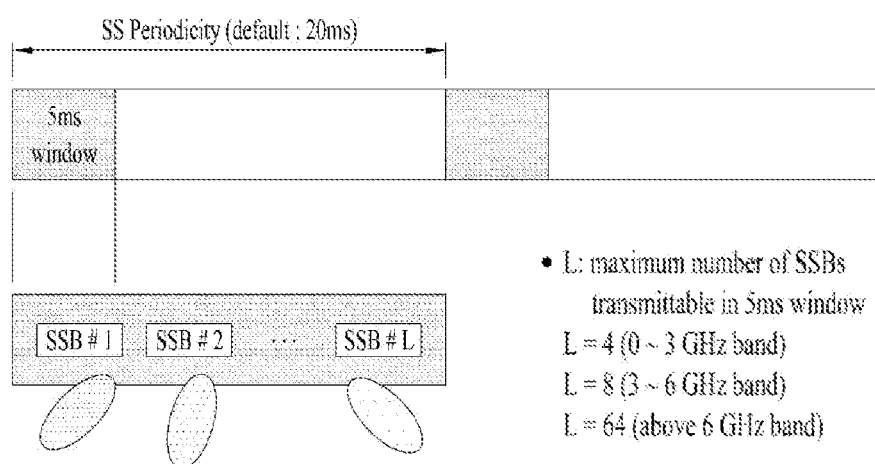
FIG. 6 is a diagram illustrating an exemplary SSB transmission method to which various embodiments of the present disclosure are applicable.

FIG. 6 is a diagram illustrating an exemplary SSB transmission method to which various embodiments of the present disclosure are applicable.

Referring to FIG. 6, the SSB is periodically transmitted according to an SSB periodicity. A default SSB periodicity assumed by the UE during initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in time order within the SSB burst set (i.e., half-frame). In the description of various embodiments of the present disclosure, the candidate SSB and the SSB candidate may be interchangeably used.

Case A: 15-kHz SCS: The indexes of the first symbols of candidate SSBs are given as {2, 8}+14*n
for operation without shared spectrum channel access (e.g., L-band and LCell): where n=0, 1 for a carrier frequency equal to or less than 3 GHz and n=0, 1, 2, 3 for a carrier frequency of 3 GHz to 6 GHz.

For operation with shared spectrum channel access (e.g., U-band and UCell): where n=0, 1, 2, 3, 4.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n For operation without shared spectrum channel access: (1) In the case of a paired spectrum operation where n=0, if for a carrier frequency equal to or less than 3 GHz and n=0, 1, 2, 3 for a carrier frequency within FR1 and greater than 3 GHz. (2) In the case of a non-paired spectrum operation, where n=0, 1 for a carrier frequency equal to or less than 2.4 GHz and n=0, 1, 2, 3 for a carrier frequency within FR1 and greater than 2.4 GHz.

For operation with shared spectrum channel access: where n=0, 1, 2, 3, 4, 6, 7, 8, 9.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Synchronization Procedure

Figure 7:
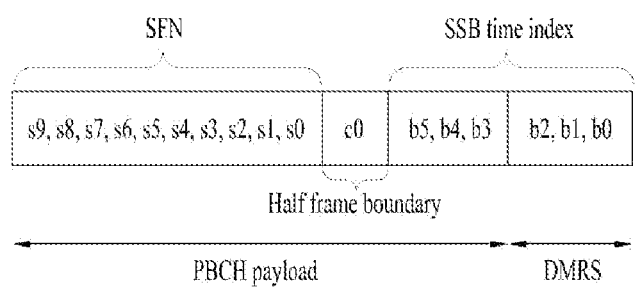
FIG. 7 illustrates acquisition of DL time synchronization information at a user equipment (UE) which various embodiments of the present disclosure are applicable.

FIG. 7 illustrates acquisition of DL time synchronization information at a UE which various embodiments of the present disclosure are applicable.

The UE may obtain DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may obtain 10-bit SFN system information s0 to s9 from the PBCH. 6 bits out of the 10-bit SFN information is obtained from a master information block (MIB), and the remaining 4 bits are obtained from a PBCH transport block (TB).

The UE may then obtain 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may obtain an SSB index based on the DMRS sequence and PBCH payload. SSB candidates are indexed with 0 to L−1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 8:
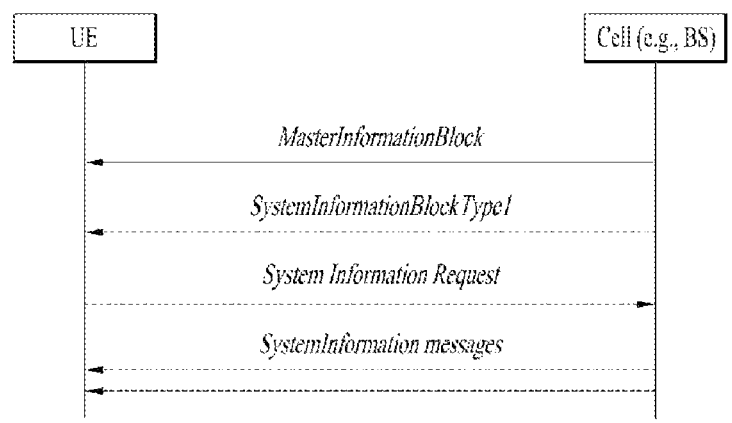
FIG. 8 illustrates a system information (SI) acquisition procedure which various embodiments of the present disclosure are applicable.

FIG. 8 illustrates a system information (SI) acquisition procedure which various embodiments of the present disclosure are applicable.

The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

The SI may be divided into a Master Information Block (MIB) and a plurality of System Information Blocks (SIBs). The SI other than the MIB may be referred to as Remaining Minimum System Information (RMSI), which will be described below in detail.

The MIB may include information/parameters related to reception of SystemInformationBlockType1 (SIB1) and may be transmitted through the PBCH of the SSB.

The MIB may include information/parameters related to reception of SystemInformationBlockType1 (SIB1) and may be transmitted through the PBCH of the SSB. Information of the MIB may be understood with reference to 3GPP TS 38.331 and may include the following fields.

subCarrierSpacingCommon ENUMERATED {scs15or60, scs30or120},
ssb-SubcarrierOffset INTEGER (0 . . . 15),
pdcch-ConfigSIB1 INTEGER (0 . . . 255),
dmrs-TypeA-Position ENUMERATED {pos2, pos3},
. . .
spare BIT STRING (SIZE (1))

Descriptions of the fields are shown in Table 9 below.

TABLE 9 pdcch-ConfigSIB1
Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213, clause 13).
ssb-SubcarrierOffset
Corresponds to $k_{SSB}$ (see TS 38.213), which is the frequency domain offset between SSB and the overall resource block grid in number of subcarriers. (See TS 38.211, clause 7.4.3.1).
The value range of this field may be extended by an additional most significant bit encoded within PBCH as specified in TS 38.213.
This field may indicate that this cell does not provide SIB1 and that there is hence no CORESET#0 configured in MIB (see TS 38.213, clause 13). In this case, the field pdcch-ConfigSIB1 may indicate the frequency positions where the UE may (not) find a SS/PBCH with a control resource set and search space for SIB1 (see TS 38.213, clause 13).
subCarrierSpacingCommon
Subcarrier spacing for SIB1, Msg.2/4 for initial access, paging and broadcast SI-messages. If the UE acquires this MIB on an FRI carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.
dmrs-TypeA-Position
Position of (first) DM-RS for downlink (e.g., PDSCH) and uplink (e.g., PUSCH), pos2 represents the $2^{nd}$ symbol in a slot and pos2 represents the 3rd symbol in a slot.

When selecting an initial cell, the UE may assume that a half-frame having the SSB is repeated at a period of 20 ms. The UE may check whether a Control Resource Set (CORESET) (e.g., CORESET #0) for a Type0-PDCCH common search space is present based on the MIB. In $k_{SSB}$<=23 (for FR1) or $k_{SSB}$<=11 (for FR2), the UE may determine that the CORESET for the Type0-PDCCH common search space is present. In the case of $k_{SSB}$>23 (for FR1) or $k_{SSB}$>11 (for FR2), the UE may determine that the CORESET for the Type0-PDCCH common search space is not present. The Type0-PDCCH common search space may be a type of a PDCCH search space and may be used to transmit a PDCCH for scheduling an SI message. When the Type0-PDCCH common search space is present, the UE may determine (i) a plurality of consecutive RBs included in the CORESET (e.g., CORESET #0) and one or more consecutive symbols and (ii) a PDCCH occasion (i.e., a location in the time domain for reception of the PDCCH) (e.g., search space #0) based on information in the MIB (e.g., pdcch-ConfigSIB1). When the Type0-PDCCH common search space is not present, the pdcch-ConfigSIB1 may provide information on a frequency position at which SSB/SIB1 is present and a frequency range in which the SSB/SIB1 is not present.

The SIB1 may include information related to the availability and scheduling (e.g., a transmission period and an SI-window size) of the remaining SIBs (hereinafter an SIBx, x being an integer equal to or greater than 2). For example, the SIB1 may inform whether SIBx is periodically broadcast or is provided in response to a request of the UE using an on-demand method. When the SIBx is provided using the on-demand method, the SIB1 may include information required to make a request for the SI by the UE. The SIB1 may be transmitted through a PDSCH, a PDCCH for scheduling the SIB1 may be transmitted through the Type0-PDCCH common search space, and the SIB1 may be transmitted through a PDSCH indicated by the PDCCH.

The SIBx may be included in an SI message and may be transmitted through a PDSCH. Each SI message may be transmitted within a window (i.e., an SI-window) that is periodically generated.

Beam Alignment

Figure 9:
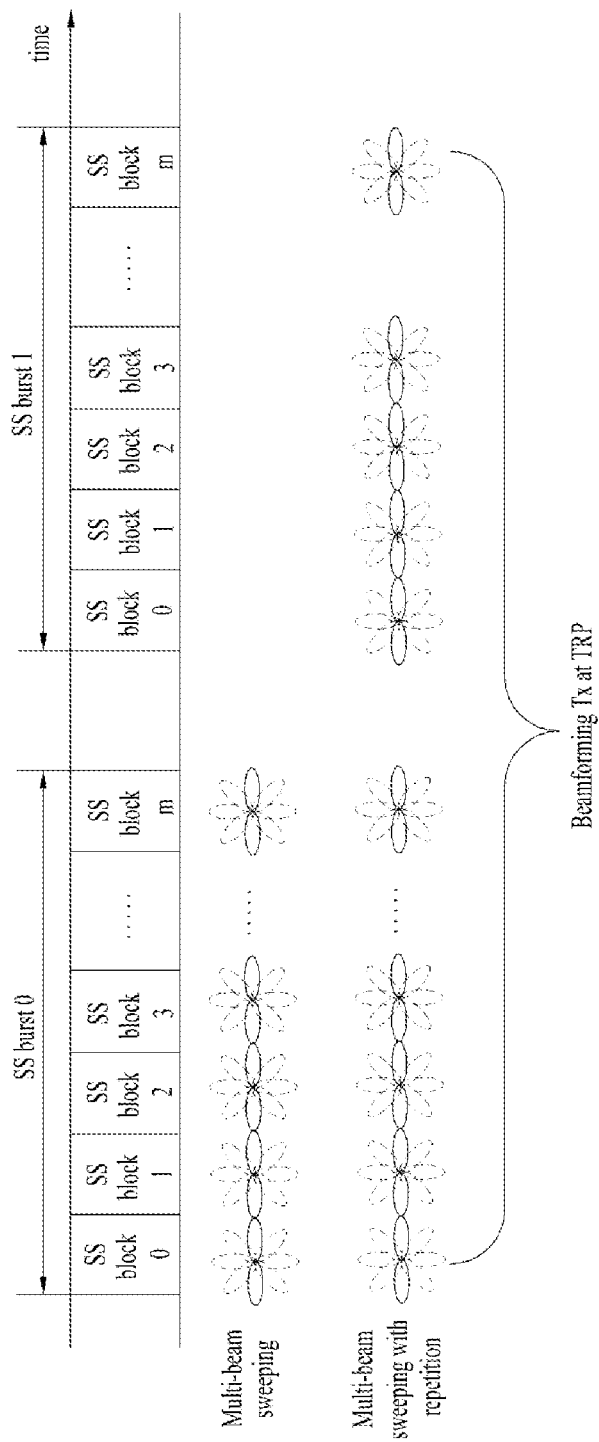
FIG. 9 is a diagram illustrating exemplary multi-beam transmission to which various embodiments are applicable.

FIG. 9 is a diagram illustrating exemplary multi-beam transmission to which various embodiments are applicable.

Beam sweeping refers to changing the beam (direction) of a radio signal over time by a transmission reception point (TRP) (e.g., BS/cell) (hereinafter, the terms beam and beam direction are interchangeably used). SSBs may be transmitted periodically by beam sweeping. In this case, SSB indices are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of contiguous SSBs. The maximum number of times that the SSB is transmitted in an SSB burst set, L may have a value of 4, 8, or 64 depending on the frequency band of a carrier. Accordingly, the maximum number of SSB beams in the SSB burst set may be given according to the frequency band of the carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

When multi-beam transmission is not applied, the number of SSB beams is 1.

When the UE attempts to initially access the BS, the UE may align beams with those of the BS based on the SSB. For example, the UE identifies the best SSB after performing SSB detection. Thereafter, the UE may transmit a RACH preamble to the BS on a PRACH resource linked/corresponding to the index (i.e., beam) of the best SSB. The SSB may be used to align beams between the BS and UE after the initial access.

Channel Measurement and Rate-Matching

Figure 10:
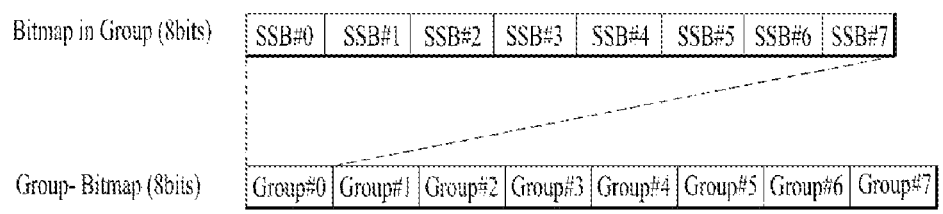
FIG. 10 is a diagram illustrating a method of indicating an actually transmitted SSB (SSB_tx) to which various embodiments are applicable.
Figure 11:
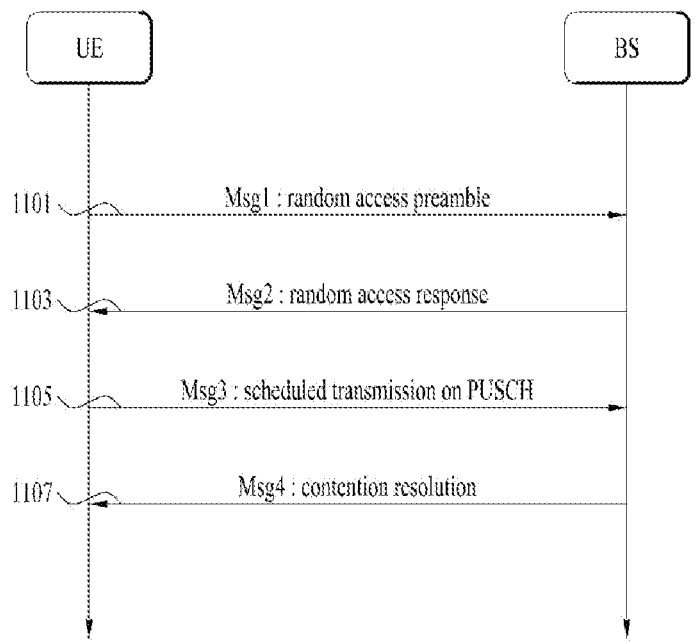
FIG. 11 is a diagram illustrating an exemplary 4-step random access channel (RACH) procedure to which various embodiments of the present disclosure are applicable.
Figure 11:
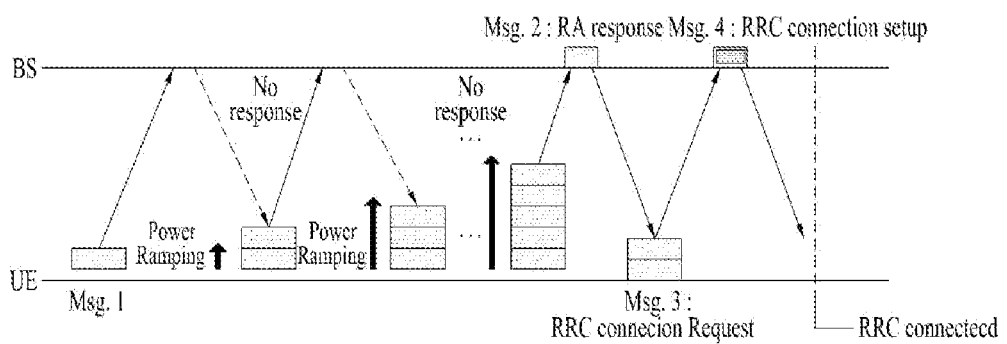

FIG. 10 is a diagram illustrating a method of indicating an actually transmitted SSB (SSB_tx) to which various embodiments are applicable.

A maximum of L SSBs may be transmitted in an SSB burst set, and the number and positions of actually transmitted SSBs may vary for each BS/cell. The number and positions of actually transmitted SSBs may be used for rate-matching and measurement, and information about actually transmitted SSBs (e.g., ssb-PositionsInBurst) may be indicated as follows.

When the number and positions of actually transmitted SSBs are related to rate-matching, the information may be indicated by UE-specific RRC signaling or RMSI. The UE-specific RRC signaling includes a full bitmap (e.g., of length L) for frequency ranges below and above 6 GHz. The RMSI includes a full bitmap for frequency ranges below 6 GHz and a compressed bitmap for frequency ranges above 6 GHz. Specifically, the information about actually transmitted SSBs may be indicated by group-bitmap (8 bits)+intra-group bitmap (8 bits). Resources (e.g., REs) indicated by the UE-specific RRC signaling or RMSI may be reserved for SSB transmission, and a PDSCH and/or PUSCH may be rate-matched in consideration of the SSB resources.

When the number and positions of actually transmitted SSBs are related to measurement, the network (e.g., BS) may indicate an SSB set to be measured within a measurement period if the UE is in the RRC connected mode. The SSB set may be indicated for each frequency layer. If no SSB set is indicated, a default SSB set may be used. The default SSB set includes all SSBs within the measurement period. The SSB set may be indicated by a full bitmap (e.g., of length L) of RRC signaling. When the UE is in the RRC idle mode, the default SSB set is used.

2. Random Access (RACH) Procedure

When a UE initially accesses a BS or has no radio resources for a signal transmission, the UE may perform a random access procedure with the BS.

The random access procedure is used for various purposes. For example, the random access procedure may be used for initial network access in an RRC_IDLE state, an RRC connection reestablishment procedure, handover, UE-triggered UL data transmission, transition in an RRC_INACTIVE state, time alignment establishment in SCell addition, OSI request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (4-step RACH) procedure and a 2-step random access (2-step RACH) procedure.

2.1. 4-Step RACH: Type-1 Random Access Procedure

Figure 14:
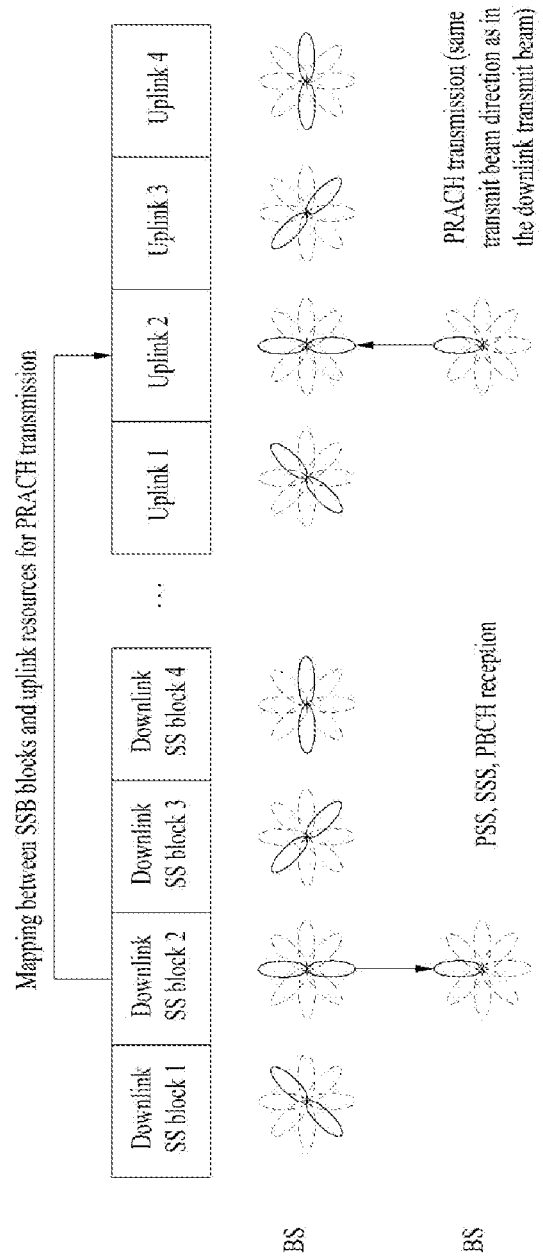
FIG. 14 is a diagram illustrating transmission of SSBs and physical random access channel (PRACH) resources linked to the SSBs according to various embodiments of the present disclosure.

FIG. 14 is a diagram illustrating an exemplary 4-step RACH procedure to which various embodiments of the present disclosure are applicable.

When the (contention-based) random access procedure is performed in four steps (4-step RACH procedure), the UE may transmit a message (Message 1 (Msg1)) including a preamble related to a specific sequence on a PRACH (1401) and receive a PDCCH and a response message (RAR message) (Message 2 (Msg2)) for the preamble on a PDSCH corresponding to the PDCCH (1403). The UE transmits a message (Message 3 (Msg3)) including a PUSCH based on scheduling information included in the RAR (1405) and perform a contention resolution procedure involving reception of a PDCCH signal and a PDSCH signal corresponding to the PDCCH signal. The UE may receive a message (Message 4 (Msg4)) including contention resolution information for the contention resolution procedure from the BS (1707).

The 4-step RACH procedure of the UE may be summarized in Table 10 below.

TABLE 10

| | Type of Signals | Operations/Information obtained |
|---|---|---|
| $1^{st}$ step | PRACH preamble in UL | Initial beam obtainment<br>Random selection of RA-preamble ID |
| $2^{nd}$ step | Random Access Response on DL-SCH | Timing Advanced information<br>RA-preamble ID<br>Initial UL grant, Temporary C-RNTI |
| $3^{rd}$ step | UL transmission on UL-SCH | RRC connection request<br>UE identifier |
| $4^{th}$ step | Contention Resolution on DL | Temporary C-RNTI on PDCCH for initial access<br>C-RNTI on PDCCH for UE in RRC_CONNECTED |

In the random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits a RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in an RACH resource associated with the selected SSB. For example, when retransmitting the RACH preamble, the UE may reselect one of the SSBs and retransmit the RACH preamble in an RACH resource associated with the reselected SSB. That is, the RACH resource for the retransmission of the RACH preamble may be identical to and/or different from the RACH resource for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest pathloss and a power ramping counter.

The RAR information may include a preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may measure the time difference between a PUSCH/PUCCH/SRS reception and a subframe and transmit the timing advance information based on the time difference. The UE may transmit a UL signal as Msg3 of the random access procedure on a UL-SCH based on the RAR information. Msg3 may include an RRC connection request and a UE ID. The network may transmit Msg4 in response to Msg3. Msg4 may be treated as a contention resolution message on DL. As the UE receives Msg4, the UE may enter an RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant starts from the most significant bit (MSB) and ends in the least significant bit (LSB), given as Table 11.

TABLE 11

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 12.

TABLE 12

| TPC command | value [dB] |
|---|---|
| 0 | −6 |
| 1 | −4 |
| 2 | −2 |
| 3 | 0 |
| 4 | 2 |
| 5 | 4 |

TABLE 12-continued

| TPC command | value [dB] |
|---|---|
| 6 | 6 |
| 7 | 8 |

2.2. 2-Step RACH: Type-2 Random Access Procedure

Figure 12:
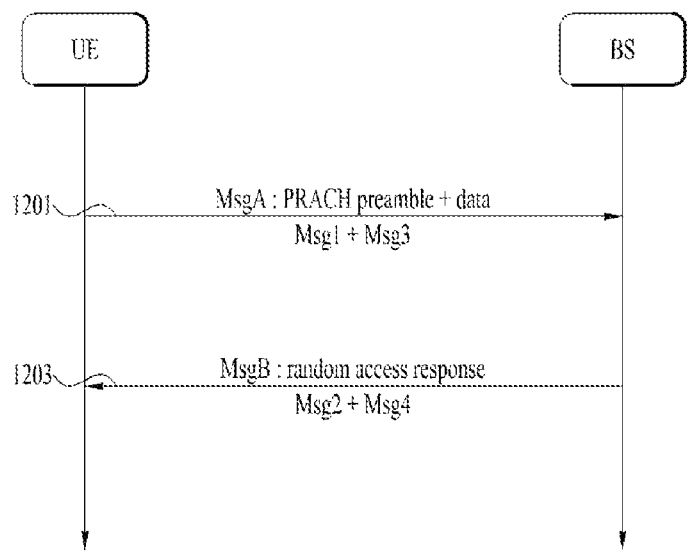
FIG. 12 is a diagram illustrating an exemplary 2-step RACH procedure to which various embodiments of the present disclosure are applicable.

FIG. 12 is a diagram illustrating an exemplary 2-step RACH procedure to which various embodiments of the present disclosure are applicable.

The (contention-based) RACH procedure performed in two steps, that is, the 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (1201).

Further, in the 2-step RACH procedure, the BS may combine Msg2 and Msg4 of the 4-step RACH procedure into one message (e.g., MsgB) and transmit the message to the UE (1203).

The 2-step RACH procedure may become a low-latency RACH procedure based on the combinations of these messages.

More specifically, MsgA may carry a PRACH preamble included in Msg1 and data included in Msg3 in the 2-step RACH procedure. In the 2-step RACH procedure, MsgB may carry an RAR included in Msg2 and contention resolution information included in Msg4.

2.3. Contention-Free RACH

Figure 13:
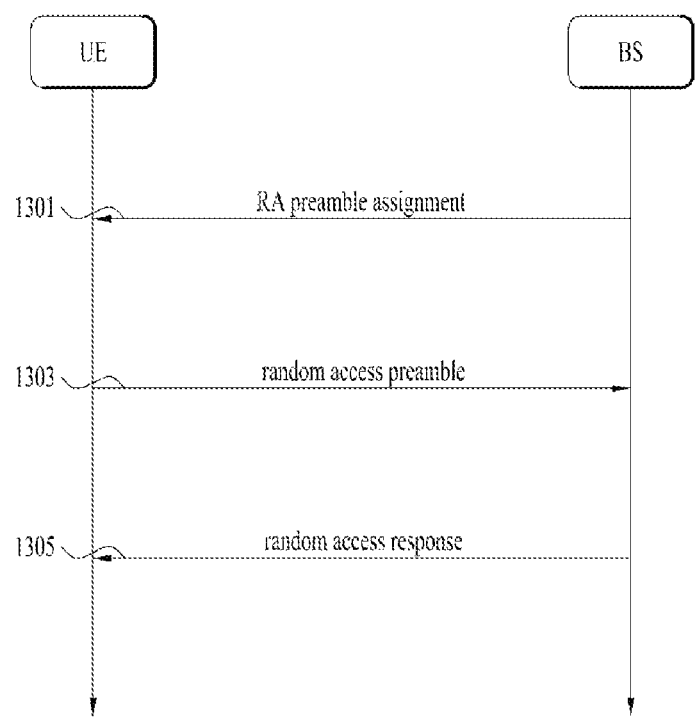
FIG. 13 is a diagram illustrating an exemplary contention-free RACH procedure to which various embodiments of the present disclosure are applicable.

FIG. 13 is a diagram illustrating an exemplary contention-free RACH procedure to which various embodiments of the present disclosure are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (1901). Information about the dedicated RACH preamble may be included in an RRC message (e.g., a handover command) or provided to the UE by a PDCCH order. When the RACH procedure starts, the UE transmits the dedicated RACH preamble to the BS (1903). When the UE receives an RAR from the BS, the RACH procedure is completed (1905).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SIB1.

2.4. Mapping Between SSB Block and PRACH Resource (Occasion)

Figure 15:
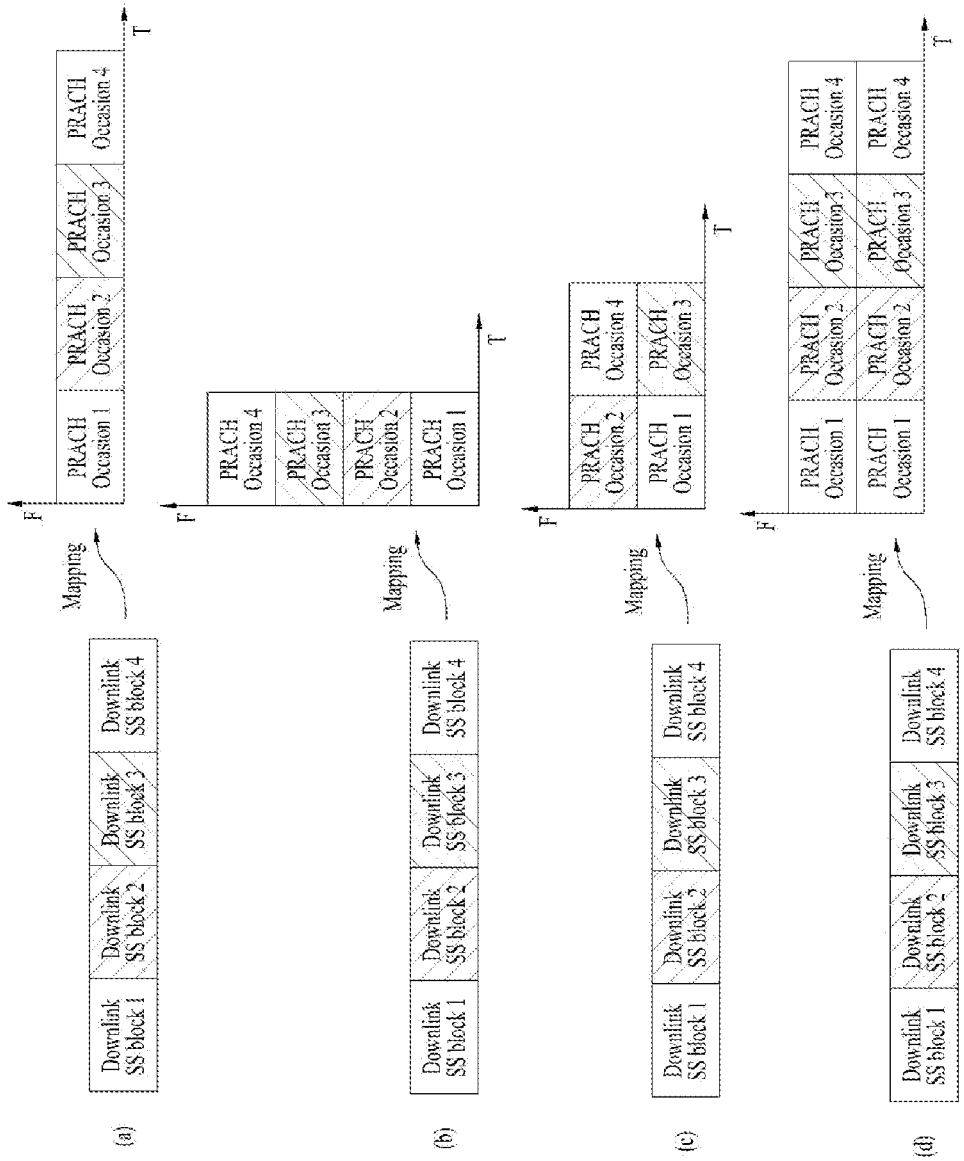
FIG. 15 is a diagram illustrating transmission of SSBs and PRACH resources linked to the SSBs according to various embodiments of the present disclosure.

FIGS. 14 and 15 are diagrams showing an example of transmission of an SS block and a PRACH resource linked to the SS block according to various embodiments of the present disclosure.

In order for a BS to communicate with one UE, an optimum beam direction between the BS and the UE needs to be found, and as the UE moves, the optimum beam direction may be changed, and thus the optimum beam direction needs to be continuously tracked. A procedure of finding the optimum beam direction between a BS and a UE may be referred to as a beam acquisition procedure, and a procedure of continuously tracking the optimum beam direction may be referred to as a beam tracking procedure. The procedure may be required for a state in which the optimum beam is lost and communication with the BS is not capable of being maintained in an optimum communication state or enters a state in which communication is impossible, that is, beam recovery for recovering beam failure during 1) initial access in which the UE attempts first access to the BS, 2) handover from one BS to another BS, and 3) beam tracking of finding an optimum beam between the UE and the BS.

A multi-step beam acquisition procedure is being discussed for beam acquisition in an environment using multiple beams in the case of the NR system. In the multi-step beam acquisition procedure, the BS and the UE may perform connection setup using a wide beam in an initial access stage, and after the connection setup is completed, the BS and the UE may perform communication with the optimum quality using a narrow beam. An example of the beam acquisition procedure in an NR system to which various embodiments of the present disclosure will be described below.

1) The BS may transmit a synchronization block for each wide bam in order for the UE to find a BS in an initial access stage, that is, to perform cell search or cell acquisition, to measure the quality for a channel for each beam of a wide beam, and to find an optimum wide beam to be used in a primary stage of beam acquisition.

2) The UE may perform cell search on a synchronization block for each beam and may perform DL beam acquisition using a detection result for each beam.

3) The UE may perform an RACH procedure in order to inform that the UE intends to access a BS that the UE finds.

4) In order for the UE to notify the BS of the DL beam acquisition result (e.g., a beam index) at a wide beam level simultaneously with the RACH procedure, the BS may connect or relate a synchronization block transmitted for each beam and a PRACH resource to be used for PRACH transmission. When the UE performs the RACH procedure using the PRACH resource connected to the optimum beam direction that the UE finds, the BS may acquire information on a DL beam appropriate for the UE during a procedure of receiving a PRACH preamble.

In a multi-beam environment, it may be important to accurately determine a Tx beam and/or a Rx beam direction between the UE and a transmission and reception point (TRP) by the UE and/or the TRP. In the multi-beam environment, beam sweeping for repeatedly transmitting a signal or receiving a signal depending on TX/RX reciprocal capability of the TRP (e.g., a BS) or a UE may be considered. The TX/RX reciprocal capability may be referred to as TX/RX beam correspondence in the TRP and the UE. In the multi-beam environment, when the TX/RX reciprocal capability in the TRP and the UE is not held, the UE may shoot a UL signal in a beam direction in which the UE receives a DL signal. This is because an optimum path of UL and an optimum path of DL are different. The TX/RX beam correspondence in the TRP may be held when the TRP determines a TRP RX beam for corresponding UL reception based on DL measurement of the UE with respect to one or more TX beams of the TRP and/or the TRP determines a TRP TX beam for corresponding DL transmission based on UL measurement of TRP' with respect to one or more RX beams of the TRP. The TX/RX beam correspondence in the UE may be held when the UE determines a UE RX beam for corresponding UL transmission based on DL measurement of the UE with respect to one or more RX beams of the UE and/or the UE determines a UE RX beam for corresponding DL reception based on indication of the TRP based on UL measurement with respect to one or more TX beams of the UE.

2.5. PRACH Preamble Structure

In an NR system, an RACH signal used for initial access to a BS, that is, initial access to the BS through a cell used by the BS may be configured using the following factors.

Cyclic prefix (CP): This may prevent interface from a previous/forward (OFDM) symbol and may bundle PRACH preamble signals reaching a BS with various time delays in the same time zone. That is, when the CP is set to be appropriate for the maximum cell radius, PRACH preambles transmitted in the same resource by UEs in the cell may enter a PRACH reception window corresponding to the length of a PRACH preamble set by the BS for PRACH reception. The length of the CP may be generally set to be equal to or greater than the maximum round trip delay. The CP may have a length TCP.

Preamble (sequence): A sequence for detecting transmission of a signal by a BS may be defined, and a preamble may carry the sequence. The preamble sequence may have a length TSEQ.

Guard time (GT): This may be a duration defined to prevent a PRACH signal that is transmitted from the farthest to the BS in PRACH coverage and arrives at the BS with delay from interfering with a signal arriving at the BS after a PRACH symbol duration, and the UE does not transmit a signal during the duration, and thus the GT may not be defined based on the PRACH signal. The GT may have a length TGP.

2.6. Mapping to Physical Resources for Physical Random-Access Channel

A random-access preamble may be transmitted within only a time resource acquired based on a RACH configuration table that is preconfigured for RACH configuration, FR1, FR2, and a preconfigured spectrum type.

A PRACH configuration index in the RACH configuration table may be given as follows.

For a RACH configuration table for Random access configurations for FR1 and an unpaired spectrum, the PRACH configuration index in the RACH configuration table may be given from a higher layer parameter prach-ConfigurationIndexNew (if configured). Otherwise, the PRACH configuration index in the RACH configuration table may be given from prach-ConfigurationIndex, msgA-prach-ConfigurationIndex, msgA-prach-ConfigurationIndexNew (if configured), or the like.

The PRACH configuration index in the RACH configuration table may be given from higher layer parameter prach-ConfigurationIndex, msgA-prach-ConfigurationIndexNew (if configured), or the like for a RACH configuration table about Random access configurations for FR1 and paired spectrum/supplementary uplink and a RACH configuration table about Random access configurations for FR2 and unpaired spectrum.

The RACH configuration table may be a table about a relationship between one or more of a PRACH configuration Index, a Preamble format, $n_{SFN}$ mod x=y, a Subframe number, a Starting symbol, the Number of PRACH slots, the number of time-domain PRACH occasions within a PRACH slot, and a PRACH duration in cases.

The cases will be described below:
(1) Random access configurations for FR1 and paired spectrum/supplementary uplink
(2) Random access configurations for FR1 and unpaired spectrum
(3) Random access configurations for FR2 and unpaired spectrum Table 13 below shows a portion of an example of a RACH configuration index for (2) Random access configurations for FR1 and unpaired spectrum.

TABLE 13

| PRACH Configuration Index | Preamble format | $n_f$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |

TABLE 13-continued

| PRACH Configuration Index | Preamble format | $n_f$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |

The RACH configuration table shows specific values for parameters (e.g., preamble format, periodicity, SFN offset, RACH subframe/slot index, starting OFDM symbol, number of RACH slots, number of occasions, OFDM symbols for RACH format, etc.) required to configure RACH occasions. When the RACH configuration index is indicated, specific values related to the indicated index may be used.

For example, when the starting OFDM symbol parameter is n, one or more consecutive (time-domain) RACH occasions may be configured from an OFDM symbol having index #n.

For example, the number of one or more RACH occasions may be indicated by the following parameter: number of time-domain PRACH occasions within a RACH slot.

For example, a RACH slot may include one or more RACH occasions.

For example, the number of RACH slots (in a subframe and/or slot with a specific SCS) may be indicated by the parameter: number of RACH slots.

For example, a system frame number (SFN) including RACH occasions may be determined by $n_{SFN}$ mod x=y, where mod is a modular operation (modulo arithmetic or modulo operation) which is an operation to obtain remainder r obtained by dividing dividend q by divisor d (r=q mod(d)).

For example, a subframe/slot (index) including RACH occasions in a system frame may be indicated by the parameter: RACH subframe/slot index.

For example, a preamble format for RACH transmission/reception may be indicated by the parameter: preamble format.

Figure 16:
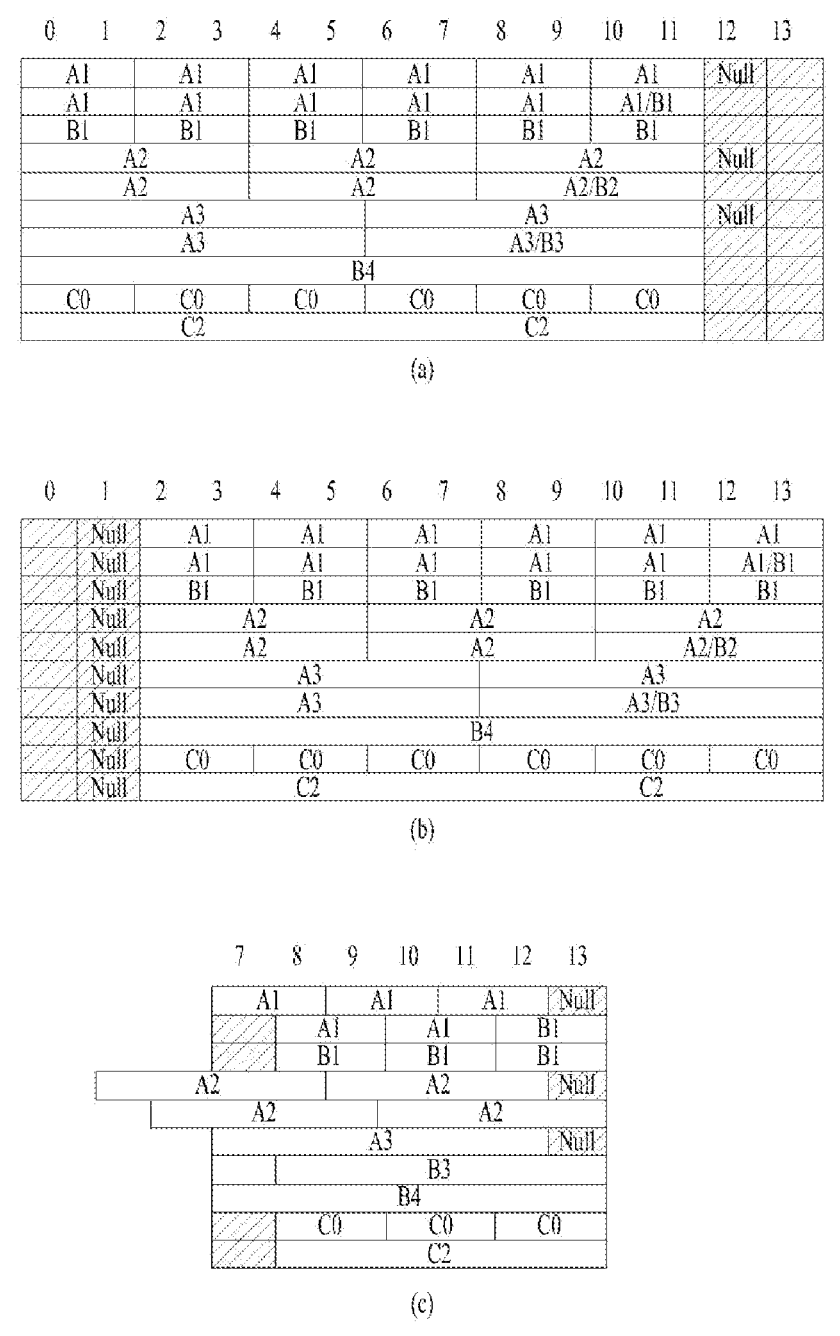

Referring to FIG. 16(a), for example, when the starting OFDM symbol is indicated as 0, one or more consecutive (time-domain) RACH occasions may be configured from OFDM symbol #0. For example, the number of one or more RACH occasions may depend on a value indicated by the parameter: number of time-domain RACH occasions within a RACH slot. For example, the preamble format may be indicated by the parameter: preamble format. For example, preamble formats A1, A2, A3, B4, C0, C2, etc. may be indicated. For example, one of the last two OFDM symbols may be used as the GT, and the other may be used for transmission of other UL signals such as a PUCCH, a sounding reference signal (SRS), etc.

Referring to FIG. 16(b), for example, when the starting OFDM symbol is indicated by 2, one or more consecutive (time-domain) RACH occasions may be configured from OFDM symbol #2. For example, 12 OFDM symbols may be used for a RACH occasion, and no GT may be configured in the last OFDM symbol. For example, the number of one or more RACH occasions may depend on a value indicated by the parameter: number of time-domain RACH occasions within a RACH slot. For example, the preamble format may be indicated by the parameter: preamble format. For example, preamble formats A1/B1, B1, A2/B2, A3/B3, B4, C0, C2, etc. may be indicated.

Referring to FIG. 16(c), for example, when the starting OFDM symbol is indicated as 7, one or more consecutive (time-domain) RACH occasions may be configured from OFDM symbol #7. For example, 6 OFDM symbols may be used for an RACH occasion, and the last OFDM symbol (OFDM symbol #13) may be used for transmission of other UL signals such as a PUCCH, an SRS, etc. For example, the number of one or more RACH occasions may depend on a value indicated by the parameter: number of time-domain RACH occasions within a RACH slot. For example, the preamble format may be indicated by the parameter: preamble format. For example, preamble formats A1, B1, A2, A3, B3, B4, C0, C2, etc. may be indicated.

For example, the parameters included in the RACH configuration table may satisfy predetermined correspondence relationships identified/determined by the RACH configuration table and the RACH configuration index. For example, the predetermined correspondence relationships may be satisfied between the following parameters: PRACH configuration index, RACH format, period (x)=8, SFN offset (y), subframe number, starting symbol (index), number of PRACH slots within a subframe, number of PRACH occasions within a PRACH slot, PRACH duration/OFDM symbols for RACH format, etc. The correspondence relationships may be identified by the RACH configuration index and the RACH configuration table.

3. Various Embodiments of the Present Disclosure

A detailed description will be given of various embodiments of the present disclosure based on the above technical ideas. The afore-described contents of clause 1 and clause 2 are applicable to various embodiments of the present disclosure described below. For example, operations, functions, terminologies, and so on which are not defined in various embodiments of the present disclosure may be performed and described based on clause 1 and clause 2.

Symbols/abbreviations/terms used in the description of various embodiments of the present disclosure may be defined as follows.

A/B/C: A and/or B and/or C
BWP: bandwidth part
CBRA: contention-based random access
CDM: code division multiplexing (code domain sharing)
Comb: a comb may refer to a method of mapping signals at regular intervals in the frequency domain. For example, comb 2 (comb-2 or 2-comb) may mean mapping the same specific RS to each RE spaced by two subcarriers. Comb 4 (comb-4 or 4-comb) may mean mapping the same specific RS to each RE spaced by four subcarriers.
CFRA: contention-free random access
CP-OFDM: cyclic prefix based orthogonal frequency division multiplex, which may be understood as a case in which transform precoding is disabled.
DFT-s-OFDM: discrete Fourier transform spread orthogonal frequency division multiplex, which may be understood as a case in which transform precoding is enabled.
DL: downlink
DM-RS (DMRS): demodulation reference signal
FDM: frequency division multiplexing (frequency domain sharing)
MCS: modulation and coding scheme
OCC: orthogonal cover code
OFDM: orthogonal frequency division multiplexing
PAPR: peak to average power ratio
PRACH: physical random access channel
PRB: physical resource block
PRU: PUSCH resource unit
PO: PUSCH occasion
PUSCH: physical uplink shared channel
RA: random access
RACH: random access channel
RAPID: random access preamble identifier
RAR: random access response
RB: resource block
RE: resource element
RNTI: radio network temporary identifier
RO: RACH occasion or PRACH occasion
SCID: scrambling identifier
TBS: transmission block size
TDM: time division multiplexing (time domain sharing)
UL: uplink
Rel-15 (REL. 15): Rel-15 refers to 3GPP technical specification (TS) Release 15. Additionally/alternatively, Rel-15 means a system supporting 3GPP TS Release 15 and/or a system capable of coexistence therewith.
Rel-16 (REL. 16): Rel-16 refers 3GPP TS Release 16. Additionally/alternatively, Rel-15 means a system supporting 3GPP TS Release 16 and/or a system capable of coexistence therewith.

In the description of various embodiments, when it is said that something is more than/more than or equal to A, it may be interpreted to mean that A is more than or equal to/more than A.

In the description of various embodiments, when it is said that something is less than/less than or equal to B, it may be interpreted to mean that the thing is less than or equal to/less than B.

In the description of various embodiments, unless otherwise specified, (transmission of) a PUSCH may be included in (transmission of) MsgA.

In the description of various embodiments, unless otherwise stated, PUSCH/PO/PRU may be interchanged.

In the 2-step RACH procedure, MsgA transmitted in UL may include a PRACH preamble and a PUSCH resource. For example, the PRACH preamble and the PUSCH resource may be mapped together based on an SSB, and it may be difficult to establish such a relationship in a simple way. For example, the state of an RO (e.g., a periodicity, the number of available ROs, an SSB-to-RO mapping relationship, etc.) and a PUSCH configuration (e.g., a periodicity, the number of available ROs/POs, the number of DMRS antenna ports/sequences, etc.) may be considered together.

Various embodiments may relate to a method of configuring a MsgA PUSCH.

Various embodiments may relate to a method of configuring a DMRS for a MsgA PUSCH.

Various embodiments may relate to a RACH preamble-to-PUSCH (resource unit) mapping method for supporting the 2-step RACH procedure.

Figure 17:
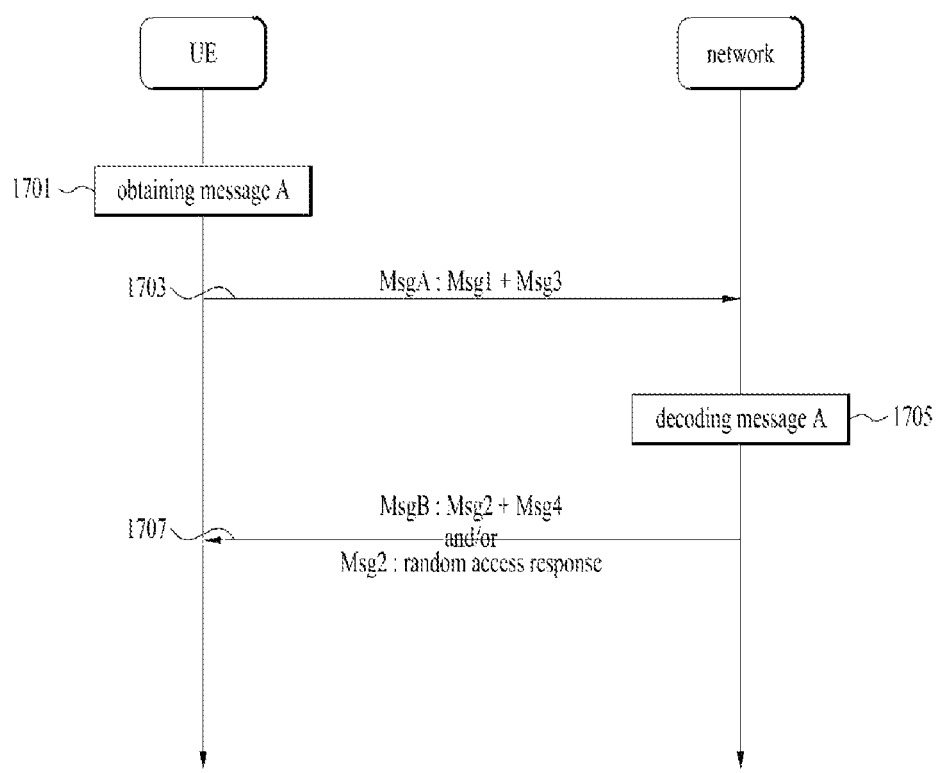
FIG. 17 is a diagram schematically illustrating a method of operating a UE and a based station (BS) according to various embodiments of the present disclosure.

FIG. 17 is a diagram schematically illustrating a method of operating a UE and a BS according to various embodiments of the present disclosure.

Figure 18:
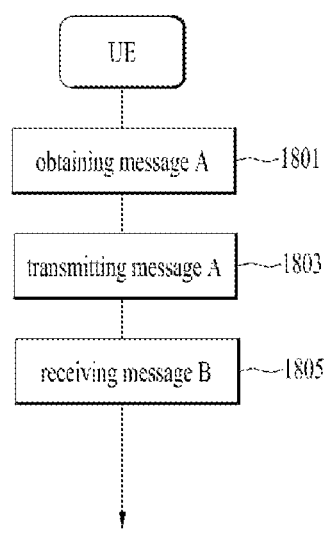
FIG. 18 is a diagram schematically illustrating a method of operating a UE according to various embodiments.

FIG. 18 is a diagram schematically illustrating a method of operating a UE according to various embodiments.

Figure 19:
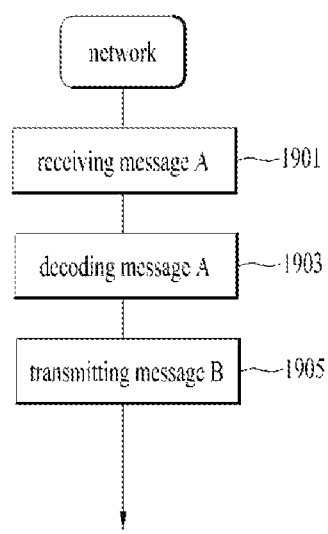
FIG. 19 is a diagram schematically illustrating a method of operating a BS according to various embodiments.

FIG. 19 is a diagram schematically illustrating a method of operating a BS according to various embodiments.

Referring to FIGS. 17 to 19, in operations 1701 and 1801 according to various embodiments, the UE may obtain/generate MsgA. For example, the UE may obtain/generate MsgA by mapping a PRACH preamble to an RO, mapping a PUSCH to a PO, and/or mapping a DMRS.

In operations 1703, 1803, and 1901 according to various embodiments, the UE may transmit MsgA, and the BS may receive MsgA.

In operations 1705 and 1903 according to various embodiments, the BS may decode (detect) MsgA. For example, the BS may decode MsgA to obtain a PRACH preamble, a PUSCH, and/or a DMRS included in MsgA.

In operations 1707, 1805, 1905 according to various embodiments, the BS may transmit MsgB and/or Msg2 in response to MsgA, and the UE may receive MsgB and/or Msg2.

Specific operations, functions, terms, etc. according to each exemplary embodiment may be performed and described based on various embodiments to be described later.

Hereinafter, various embodiments will be described in detail. It may be clearly understood by those of ordinary skill in the art that the various embodiments described below may be combined in whole or in part to constitute other embodiments unless mutually exclusive.

3.1. DMRS for MsgA PUSCH

DMRS Configuration Type for MsgA PUSCH

According to various embodiments, only Type 1 DMRS may be applied to a MsgA PUSCH of the 2-step RACH procedure.

In the NR system to which various embodiments are applicable, two DMRS types: DMRS configuration type 1 and DMRS configuration type 2 may be supported. For example, the DMRS type may be configured by dmrs-Type. If there is no corresponding information element (IE) (if the information is absent), DMRS type 1 may be used.

For example, for configuration type 1, the minimum REG may be one RE in the frequency domain. For example, for configuration type 2, the minimum REG may be two consecutive REs in the frequency domain.

For example, for configuration type 1, three pairs (6 REs) of DMRSs may be distributed in one OFDM symbol/one RB at an interval of four REs. Two REs in each pair may be separated by an interval of two REs. For example, 6 REs of a DMRS symbol may all be distributed to different REs in the frequency domain. For a double-symbol DMRS, 8 DMRS ports (ports 1000 to 1007) may be supported. For a single-symbol DMRS, four DMRS ports (ports 1000 to 1003) may be supported.

For example, for configuration type 2, two pairs (4 REs) of DMRSs may be distributed in one OFDM symbol/one RB at an interval of 6 REs. Two REs in each pair may be separated by an interval of one RE, which may mean that the two REs of each pair are contiguous. For a dual-symbol DMRS, 12 DMRS ports (ports 1000 to 1011) may be supported. For a single-symbol DMRS, 8 DMRS ports (ports 1000 to 1007) may be supported.

According to various embodiments, a Type 1 DMRS may be applied to a Msg3 PUSCH of the 4-step RACH procedure. For example, the Type 1 DMRS may be used for Msg3 transmission in a specific UL BWP.

According to various embodiments, considering that a RACH configuration for the 2-step RACH procedure may be configured by BWP-UplinkCommon applicable to UEs, only the Type 1 DMRS may be applied to the MsgA PUSCH in the 2-step RACH procedure. For example, BWP-UplinkCommon may be a cell-specific IE used to configure a common parameter for a UL BWP.

PUSCH DMRS Port/Sequence

According to various embodiments, the network (e.g., BS) may configure the number of antenna ports for a MsgA PUSCH DMRS.

According to various embodiments, the maximum number of antenna ports may be 4.

For example, when the number of configured antenna ports is 2, antenna port 0 and antenna port 1 may be used.

For example, when the number of configured antenna ports is 1, antenna port 0 may be used.

According to various embodiments, for the Type 1 DMRS, when one OFDM symbol is used, a maximum of four antenna ports may be allocated. For example, the antenna ports may be configured with frequency resources (e.g., 2-comb type resources) and cyclic shift values (e.g., 0 and $\pi$ (pi)).

According to various embodiments, PRACH preamble mapping may be defined.

According to various embodiments, PRACH preambles may be mapped to valid PRUs within a MsgA association period in the following order:
  First, in ascending order of frequency resource indices for frequency-multiplexed POs
  Second, in ascending order of DMRS indices within a single PO
    The DMRS indices may be determined in ascending order of DMRS port indices first and in ascending order of DMRS sequence indices second.
  Third, in ascending order of time resource indices for time-multiplexed POs within one PUSCH slot
  Fourth, in ascending order of PUSCH slot indices
  For multiple configurations, mapping may be performed between PRUs of each MsgA PUSCH configuration and preambles in a related preamble group.
    Each MsgA PUSCH configuration may identify a subset of DMRS port/sequence combinations.

For example, one or more consecutive preamble indices of (valid) PRACH occasions in a slot:
  First, in ascending order of preamble indices within one PRACH occasion
  Second, in ascending order of frequency resource indices for frequency-multiplexed PRACH occasions
  Third, in ascending order of time resource indices for time-multiplexed PRACH occasions within a PRACH slot
  May be mapped to a (valid) PO:
  First, in ascending order of frequency resource indices for frequency-multiplexed POs
  Second, in ascending order of DMRS indices within a PO, where the DMRS indices may be determined in ascending order of DMRS port indices first and in ascending order of DMRS sequence indices second.
  Third, in ascending order of time resource indices for time-multiplexed POs within a PUSCH slot
  Fourth, in ascending order of PUSCH slot indices.

According to various embodiments, a method of indicating DMRS resources including DMRS ports and/or DMRS sequences may be provided.

In the 4-step RACH procedure, a single antenna port may be applied for Msg3 transmission. However, in the 2-step RACH procedure, all antenna ports may be used to improve PUSCH resource efficiency.

According to various embodiments, the network (e.g., BS) may configure the number of antenna ports for a MsgA PUSCH DMRS.

According to various embodiments, network coverage and/or geometry may be considered in determining the number of antenna ports. For example, if the network coverage is relatively wide and/or the geometry is not good to support multiple UEs in a PO, a relatively low number of antenna ports (e.g., 1 or 2) may be allocated. On the contrary, for example, if the 2-step RACH procedure is performed in relatively narrow network coverage and/or with relatively good geometry, it may be allowed to allocate a relatively large number of antenna ports (e.g., 2 or 4) in a PO.

According to various embodiments, if two antenna ports are configured, antenna ports 0 and 1 (or antenna ports 2 and 3) having the same frequency resource and different cyclic shift values may be used. The reason for this is that cyclic shift may identify antenna ports even if the OFDM symbol reception timing is quite large (e.g., FFT size/4).

Sequence Initialization for MsgA PUSCH DMRS

According to various embodiments, in the case of CP-OFDM (when a DMRS is based on CP-OFDM or when transform precoding is disabled), a maximum of two different initial values and/or seed values may be configured by higher layer signals (e.g., SIB1 and/or RACH-ConfigCommon). According to various embodiments, a sequence may be designated/indicated depending on an RAPID (in the description of various embodiments, the term 'depending on' may be replaced with the following terms: based on, using, etc.).

Additionally/alternatively, according to various embodiments, when transform precoding is disabled, Equation 1 below may be used for a pseudo-random sequence generator for a MsgA PUSCH. According to various embodiments, when transform precoding is disabled, the pseudo-random sequence generator for the MsgA PUSCH may be initialized according to Equation 1 below.

$$c_{init} = (2^{17}(N^{slot}_{symb} n^{\mu}_{s,f}+1)(2N^{nSCID}_{ID}+1) + 2N^{nSCID}_{ID}+n_{SCID}) \bmod 2^{31} \qquad \text{[Equation 1]}$$

For example, $C_{init}$ may denote the initial value of the scrambling sequence generator.

For example, $N^{slot}_{symb}$ may denote the number of symbols per slot.

For example, $n^{u}_{s,f}$ may denote a slot number in a frame for SCS configuration u.

For example, $N^{0}_{ID}, N^{1}_{ID}, \ldots, N^{M-1}_{ID} \in \{0, 1, \ldots, 65535\}$ may be given by higher layer parameters: scramblingID0, scrambling ID1, and scrambling IDM-1 in higher layer signals, respectively.

For example, $n_{SCID} \in \{0, 1, \ldots, M-1\}$ may be designated depending on the RAPID.

For example, M may have a maximum value of 2.

According to various embodiments, in the case of DFT-s-OFDM (when a DMRS is based on DFT-s-OFDM or when transform precoding is enabled), one root index of a Zadoff-Chu (ZC) sequence may be configured by a higher layer signal.

According to various embodiments, multiple DMRS sequences may be applied per antenna port for enhancement of PUSCH resource efficiency. In the case of CP-OFDM, a pseudo-noise (PN) sequence may be applied as a DMRS sequence. For UL multi-user multi-input and multi-output (MU-MIMO), two different seed values may be configured by an RRC signal, and one of the two seed values may be designated/indicated by DCI. For spatially separated UEs, two different DMRS sequences may be applied even if the UEs are assigned the same antenna port. For a MsgA PUSCH, multiple DMRS sequences may be applied when CP-OFDM is used. The seed values may be configured by SIB1 and/or RACH-ConfigCommon, and, the values may be designated/indicated depending on the RAPID. Specifically, the seed values may be configured by SIB1 and/or RACH-ConfigCommon, and the values may be designated/indicated based on the RAPID of at least one of the configured seed values. For example, RACH-ConfigCommon may be an IE used to specify a cell-specific random access parameter.

According to various embodiments, for a MsgA PUSCH DMRS, Equation 1 described above may be used to initialize a pseudo-random sequence generator.

According to various embodiments, for a MsgA PUSCH, the seed values of Equation 1 (e.g., $N^{0}_{ID}$ and $N^{1}_{ID}$) may be configured by SIB1 and/or RACH-ConfigCommon.

According to various embodiments, $n_{SCID}$ of Equation 1 above may be designated depending on the RAPID. For example, if a PRU is configured with a DMRS port and a DMRS sequence index (e.g., $n_{SCID}$), $n_{SCID}$ may be automatically obtained from RAPID-to-PRU mapping.

According to various embodiments, in the case of DFT-s-OFDM, a low-PAPR sequence (e.g., ZC sequence) may be applied, and one sequence may be allocated as a DMRS sequence.

According to various embodiments, the number of PRUs in a PO may be one of $\{1, 2, 4, 8\}$.

According to various embodiments, when the number of PRUs in a PO is 1, only one set may be defined for (the number of) DMRS ports and (the number of) DMRS sequences.

According to various embodiments, when the number of PRUs in a PO is 2, two sets of combination of a DMRS port and a DMRS sequence (e.g., $\{2, 1\}$ and $\{1, 2\}$) may be defined. For example, when two antenna ports are used in a PO, one CDM group of two (CDM) groups may be configured for the two antenna ports.

According to various embodiments, when the number of PRUs in a PO is 4, two sets of combination of a DMRS port and a DMRS sequence (e.g., $\{4, 1\}$, $\{2, 2\}$) may be defined.

For example, when four antenna ports are used in a PO, two CDM groups may be used with the same DMRS sequence. For example, when two antenna ports are used in a PO, one CDM group of two (CDM) groups may be configured with two different DMRS sequences.

According to various embodiments, when the number of PRUs in a PO is 8, four antenna ports in two CDM groups may be used with two different DMRS sequences. According to various embodiments, if there is no separate configurations, two (CDM) groups may be used.

According to various embodiments, multiple PRUs may be defined depending on a combination of (the number of) DMRS ports and (the number of) DMRS sequences within PO(s).

For example, a set of PRUs in a PO may be defined as shown in Table 14.

TABLE 14

| Number of PRUs in a PO | {Number of DMRS ports, Number of DMRS sequences |
|---|---|
| 1 | {1,1} |
| 2 | (2,1), {1,2} |
| 4 | {4,1}, {2,2} |
| 8 | {4,2} |

For example, when the number of PRUs in a PO is 1, only one set may be defined for (the number of) DMRS ports and (the number of) DMRS sequences.

For example, when the number of PRUs in a PO is 2, two sets of combination of a DMRS port and a DMRS sequence (e.g., $\{2, 1\}$, $\{1, 2\}$) may be defined. For example, when two antenna ports are used in a PO, one CDM group of two (CDM) groups may be configured for the two antenna ports.

For example, when the number of PRUs in a PO is 4, two sets of combination of a DMRS port and a DMRS sequence (e.g., $\{4, 1\}$, $\{2, 2\}$) may be defined. For example, when four antenna ports are used in a PO, two CDM groups may be used with the same DMRS sequence. For example, when two antenna ports are used in a PO, one CDM group of two (CDM) groups may be configured with two different DMRS sequences.

For example, when the number of PRUs in a PO is 8, four antenna ports in two CDM groups may be used with two different DMRS sequences. According to various embodiments, if there is no separate configurations, two (CDM) groups may be used.

3.2. MsgA PUSCH Configuration

Msg A PUSCH Scrambling Sequence

According to various embodiments, for a MsgA PUSCH data scrambling sequence, an RA-RNTI and/or an RAPID may be used as the seed value of sequence initialization for CBRA.

According to various embodiments, for the MsgA PUSCH data scrambling sequence, a C-RNTI may be used as the seed value of sequence initialization for CFRA.

According to various embodiments, a value for scrambling sequence initialization $c_{int}$ may be configured with $n_{RNTI}$ and $n_{ID}$.

According to various embodiments, it may be determined which values need to be applied to $n_{RNTI}$ and $n_{ID}$ for a MsgA PUSCH of the 2-step RACH procedure.

For example, in the 4-step RACH procedure, a TC-RNTI/C-RNTI may be applied as $n_{RNTI}$ for a Msg3 PUSCH. On the other hand, for the MsgA PUSCH of the 2-step RACH procedure, the TC-RNTI/C-RNTI may not be applicable to UEs in the RRC_IDLE or RRC_INACTIVE state. Accordingly, according to various embodiments, an RNTI (e.g., RA-RNTI) different from the TC-RNTI/C-RNTI may be applied as $n_{RNTI}$. According to various embodiments, the C-RNTI may be applied as $n_{RNTI}$ to the UE in the RRC_CONNECTED state.

In the 4-step RACH procedure, $N_{ID}^{cell}$ (physical cell identifier (PCI)) may be applied as $n_{ID}$ for the Msg3 PUSCH. On the other hand, for the MsgA PUSCH of the 2-step RACH procedure, multiple RAPIDs may be mapped to one PO. In this case, for example, inter-layer interference between PUSCH data REs may increase. According to various embodiments, to reduce the interference, a plurality of scrambling sequences generated by different values of $n_{ID}$ may be applied instead of $N_{ID}^{cell}$ (applied for UL MIMO). According to various embodiments, in the case of CBRA, an RAPID may be applied as $n_{ID}$ for the MsgA PUSCH. According to various embodiments, in the case of CBRA, the RAPID and C-RNTI may be applied as seed values for sequence initialization for the MsgA PUSCH.

According to various embodiments, the PUSCH scrambling sequence initialization equation may vary depending on use cases of mapping between preambles and PRUs.

According to various embodiments, when one RAPID is mapped to a plurality of PRUs in a PO, a PUSCH scrambling sequence initialization equation based on DMRS indices may be used instead of that based on RAPIDs.

According to various embodiments, when one RAPID is mapped to multiple PRUs in each PO, the PUSCH scrambling sequence initialization equation based on RAPIDs may be used.

According to various embodiments, an initialization ID for MsgA PUSCH scrambling may be defined as shown in Equation 2 below.

$$c_{init} = \text{RA-RNTI} \times 2^{16} + \text{RAPID} \times 2^{10} + n_{ID} \quad \text{[Equation 2]}$$

For example, $C_{init}$ may denote the initial value of the scrambling sequence generator.

For example, $n_{ID}$ may be configured by a cell-specific higher layer parameter, and/or $n_{ID}=N_{ID}^{cell}$.

According to various embodiments, the RAPID may change or may not change to the DMRS index.

According to various embodiments, one-to-multiple mapping between preambles and PRUs may be supported and/or may not be supported.

According to various embodiments, for one-to-multiple mapping, the following two cases may be considered:

1) Case 1: One RAPID may be mapped to multiple PRUs in a PO.
2) Case 2: One RAPID may be mapped to multiple PRUs in each PO.

For example, including an RAPID in the equation (Equation 1, etc.) for initializing a scrambling sequence may be to improve an inter-user interference randomization effect on PUSCH resources.

In Case 1, if multiple UEs that have selected the same RAPID transmit PUSCHs with the same scrambling sequence, the BS may not obtain the inter-user interference randomization effect.

In Case 2, the BS may obtain the inter-user interference randomization effect according to the equation (Equation 1, etc.) for initializing the scrambling sequence.

According to various embodiments, whether the equation (Equation 1, etc.) for initializing a scrambling sequence including an RAPID is used may be determined depending on which one of the cases is selected for one-to-multiple mapping.

In Case 1, the RAPID may change to the DMRS index.
In Case 2, the RAPID may be used as it is.

For example, a scrambling sequence generator used to generate a PUSCH (or a scrambling sequence generator for a PUSCH) may be initialized according to Equation 3 below. At least one of the parameters used in Equation 3 below may be generated/obtained/determined according to various embodiments. Equation 3 may be understood as an equation more specific than Equation 2.

$$c_{init} = \begin{cases} n_{RNTI} \cdot 2^{16} + n_{RAPID} \cdot 2^{10} + n_{ID} & \text{for } msgA \text{ on } PUSCH \\ n_{RNTI} \cdot 2^{15} + n_{ID} & \text{otherwise} \end{cases} \quad \text{[Equation 3]}$$

For example, $C_{init}$ may denote the initial value of the scrambling sequence generator.

For example, the value of each parameter may be determined as follows.

If the RNTI is a C-RNTI, a modulation and coding scheme C-RNTI (MCS-C-RNTI), a semi-persistent channel state information RNTI (SP-CSI-RNTI), or a configured scheduling RNTI (CS-RNTI), if (PUSCH) transmission is not scheduled by DCI format 1_0 in a CSS, and if a higher layer parameter dataScramblingIdentityPUSCH is configured, $n_{ID} \in \{0, 1, \ldots, 1023\}$ may have a value indicated in the higher layer parameter dataScramblingIdentityPUSCH.

If (PUSCH) transmission is triggered by the Type-2 random access procedure (2-step RACH procedure) and if a higher layer parameter msgA-dataScramblingIdentity is configured, $n_{ID} \in \{0, 1, \ldots, 1023\}$ may have a value indicated by the higher layer parameter msgA-dataScramblingIdentity.

Otherwise, $n_{ID}=N_{ID}^{cell}$. That is, $n_{ID}$ may have the same value as a PCI. For example, $n_{ID}$ may have a value of 0 to 1007.

$n_{RAPID}$ may be the index of a random access preamble transmitted for MsgA. For example, $n_{RAPID}$ may correspond to information related to a PRACH preamble selected by the UE (or user) as the seed value of the scrambling sequence, and the user may be identified by $n_{RAPID}$.

$n_{RNTI}$ may have the same value as an RA-RNTI for MsgA (for a PUSCH included in MsgA). For example, $n_{RNTI}$ may be the seed value of the scrambling sequence, and more particularly, $n_{RNTI}$ may correspond to an RNTI used to monitor a response (from the BS) for the above-described RA-RNTI or MsgA PUSCH. As another example, $n_{RNTI}$ may have the same value as an RA-RNTI for the 4-step RACH procedure.

For example, inter-cell interference may be randomized by $n_{ID}$.

In the 2-step RACH procedure, there may be an RA-RNTI and a MsgB-RNTI related to a specific RO.

According to various embodiments, the RA-RNTI may be used to generate/obtain a PUSCH data scrambling sequence, and the MsgB-RNTI may be used to monitor a PDCCH for MsgB.

That is, according to various embodiments, the usage of the RA-RNTI and MsgB-RNTI related to the specific RO may be distinguished.

In addition, according to various embodiments, the RA-RNTI be distinguished from the RAPID and used as the seed value for generating/obtaining the PUSCH data scrambling sequence.

Supported MCS and Time-Frequency Resource Size of PUSCH in MsgA

According to various embodiments, a limited number of MCS levels may be used for a PUSCH in MsgA. For example, one and/or two MCS levels may be used.

According to various embodiments, only QPSK for CP-OFDM may be applied for the PUSCH in MsgA.

According to various embodiments, two types of coding rates may be used.

According to various embodiments, the MCS may be indicated only for a PUSCH configuration. According to various embodiments, among the MCS for a MsgA PUSCH and RRC for a TBS, only the MCS may be signaled. According to various embodiments, the TBS may be determined based on a predetermined correspondence relationship with the MCS value by a predetermined TBS table. According to various embodiments, the value range of the TBS and/or MCS may be preconfigured.

According to various embodiments, the modulation order and/or coding rate for the MsgA PUSCH may be provided.

In the 4-step RACH procedure, the MCS for Msg3 may be allocated/indicated by a UL grant in an RAR message. For example, the BS may designate the MCS from a low index to a high index depending on the channel state of the UE. For example, time/frequency resources for a PUSCH may be allocated depending on the selected MCS level and required coverage.

On the other hand, in the 2-step RACH procedure, it may be difficult to allow flexible MCS selection. If the UE selects an MCS level for UL transmission depending on DL measurement results, it may be difficult to apply the MCS level to UL transmission because the channel state as well as the interference level may significantly vary between DL and UL channels. In addition, the amount of resources required for the MsgA PUSCH may vary depending on the MCS level.

That is, if multiple MCS levels are allowed, many types of PUSCH resources may be defined and/or pre-assigned, which may not be good in terms of resource utilization.

According to various embodiments, an extremely limited number of MCS levels may be used for the PUSCH in MsgA. For example, one and/or two MCS levels may be used. According to various embodiments, only QPSK for CP-OFDM may be applied for the PUSCH in MsgA. According to various embodiments, two types of coding rates may be used.

According to various embodiments, when multiple sets for DMRS frequency resources are allowed, each DMRS frequency resource (e.g., CDM group) may be configured by a MsgA PUSCH configuration.

According to various embodiments, when multiple MCS levels are allowed for PUSCH transmission, multiple types of PUSCH resources may be configured by the MsgA PUSCH configuration depending on the MCS level.

According to various embodiments, a value range configured by ssb-perRACH-OccasionAndCB-Preambles-PerSSB-msgA (msgA-SSB-PerRACH-OccasionAndCB-PreamblesPerSSB) may be divided into N parts (where N is a natural number). According to various embodiments, a part of the value range may consist of a set of RAPIDs, which may be associated with MsgA PUSCH configuration(s). In addition, according to various embodiments, other parts of the value range may be associated with other MsgA PUSCH configurations.

According to various embodiments, msgA-SSB-Per-RACH-OccasionAndCB-PreamblesPerSSB may be included in RACH-ConfigCommonTwoStepRA used to specify cell-specific parameters for the 2-step RACH procedure.

According to various embodiments, msgA-SSB-Per-RACH-OccasionAndCB-PreamblesPerSSB may be defined as shown in Table 15 below.

TABLE 15

| msgA-SSB-PerRACH-OccasionAndCB-PreamblesPerSSB |
| --- |
| The meaning of this field is twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). If the field is not configured and both 2-step and 4-step are configured for the BWP, the UE applies the value in the field ssb-perRACH-OccasionAndCB-PreamblesPerSSB in RACH-ConfigCommon. The field is not present when RACH occasions are shared between 2-step and 4-step type random access in the BWP. |

According to various embodiments, when multiple MCS levels are allowed for PUSCH transmission, multiple types of PUSCH resources may be defined depending on MCS levels. As a result, according to various embodiments, when a PUSCH resource is associated/related to a RAPID, the RAPID may also be associated/related to an MCS level. Accordingly, according to various embodiments, if the UE determines an appropriate MCS level for PUSCH transmission, the UE may select the RAPID associated with the MCS level.

According to various embodiments, if multiple sets of DMRS frequency resources are allowed, each DMRS frequency resource may be defined in association with an MCS level.

For example, assuming two different PUSCH resources (e.g., a first larger frequency resource (set) for a lower MCS level and a second smaller frequency resource (set) for a higher MCS level), two different frequency resource sets may be designated for each PUSCH resource.

Figure 20:
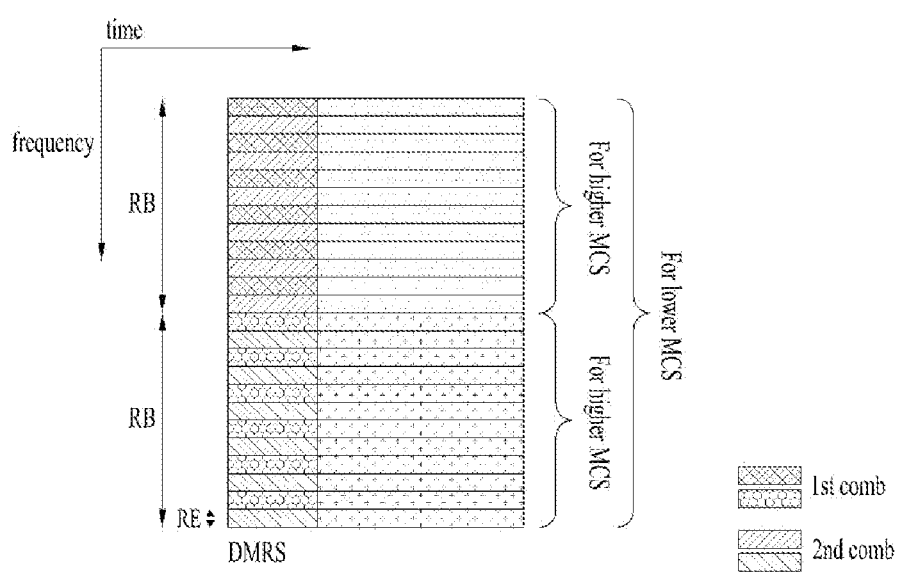
FIG. 20 is a diagram illustrating an exemplary resource configuration for message A (MsgA) according to various embodiments.

FIG. 20 is a diagram illustrating an exemplary resource configuration for MsgA according to various embodiments. Specifically, FIG. 20 illustrates an example of designating a DMRS RE depending on a PUSCH resource and an MCS level according to various embodiments.

Referring to FIG. 20, for example, when a relatively high MCS level is used for a PUSCH included in MsgA, a relatively small frequency resource consisting of one RB may be used for the PUSCH included in MsgA. That is, when a relatively high MCS level is used for a PUSCH included in MsgA, the PUSCH included in MsgA may be allocated to a relatively small frequency resource consisting of one RB.

For example, when a relatively low MCS level is used for a PUSCH included in MsgA, a relatively large frequency resource consisting of two RBs may be used for the PUSCH included in MsgA. That is, when a relatively low MCS level is used for a PUSCH included in MsgA, the PUSCH included in MsgA may be allocated to a relatively large frequency resource consisting of two RBs.

For example, a first comb including a set of REs each having an even index and a second comb including a set of REs each having an odd index may be configured.

For example, when a relatively high MCS level is used for a PUSCH included in MsgA, a DMRS may be allocated to the first comb.

In addition, when a relatively low MCS level is used for a PUSCH included in MsgA, a DMRS may be allocated to the 2nd comb.

That is, a DMRS resource (e.g., a DMRS port) for a PUSCH included in MsgA may be determined based on the MCS level.

Alternatively, for multiple PUSCH configurations having overlapped DMRS symbols, the BS (and/or network) may allocate a different CDM group to each MsgA PUSCH configuration.

According to various embodiments, at least two MsgA PUSCH configurations may be supported. According to various embodiments, parameters (e.g., an MCS, an MCS/TBS, an antenna port/sequence, a time/frequency resource for a PO, a duration/slot offset for a PO group, etc.) may be configured independently for each MsgA PUSCH configuration. According to various embodiments, allowing multiple configurations may be to configure different MCS levels and/or different time/frequency resources. Additionally/alternatively, according to various embodiments, a different period/offset may be configured for each MsgA PUSCH configuration.

On the other hand, if the number of valid POs in the time domain varies, MsgA preamble-to-PRU mapping may become more difficult. Accordingly, according to various embodiments, POs configured by different MsgA PUSCH configurations may be located at least at the same time position.

According to various embodiments, the configured POs may overlap in the time/frequency domain. According to various embodiments, if a different CDM group is configured for each PO, the network may separate multiple UL signals transmitted on time/frequency resources (see FIG. 20).

PUSCH Configuration Indication

According to various embodiments, a preamble group in CBRA may be used for both MsgA PUSCH indication and preamble group indication.

For example, if preamble groups A and B are used for the 2-step RACH procedure, these preamble groups may be used to indicate both a MsgA PUSCH configuration and a preamble group.

For example, the UE may select a preamble group depending on the message size for transmission.

For example, if preamble groups A and B are not configured for the 2-step RACH procedure, these preamble groups may be used only to indicate a MsgA PUSCH configuration.

For example, the UE may select a preamble group depending on the channel state (e.g., synchronization signal reference signal received power (SS-RSRP)).

According to various embodiments, a value range configured by ssb-perRACH-OccasionAndCB-PreamblesPerSSB-msgA (msgA-SSB-PerRACH-OccasionAndCB-PreamblesPerSSB) may be divided into N parts (where N is a natural number). According to various embodiments, a part of the value range may consist of a set of RAPIDs, which may be associated with a MsgA PUSCH configuration. According to various embodiments, other parts of the value range may be associated with other PUSCH configurations.

According to various embodiments, a method of indicating selection of different PUSCH configurations may be provided.

According to various embodiments, for two configurations, different preamble groups may be used to indicate different configurations.

According to various embodiments, the maximum number of configurations may be defined as follows:
   In REL. 16, two or more MsgA PUSCH configurations may not be supported for the UE in the RRC_IDLE/INACTIVE state.
   For the UE in the RRC_ACTIVE state:
      A maximum of two MsgA PUSCH configurations may be supported in a UL BWP.
         When no MsgA PUSCH configuration is configured for the UL BWP, the initial BWP configuration may be applied.
         A preamble group-based method defined for the RRC_IDLE/INACTIVE state may be used.
         The number of MsgA PUSCH configurations may or may not be equal to that for the UE in the RRC_IDLE/INACTIVE state.
         At least one of PRACH configuration(s) or MsgA PUSCH configuration(s) may be BWP-specific and/or cell-specific.

According to various embodiments, preamble groups A and B may be introduced for the for 2-step RACH procedure.

According to various embodiments, selection formulas for the 4-step RACH procedure of REL. 15 may be used for selection one of the 2-step RACH preamble groups: preamble groups A and B.

According to various embodiments, a parameter ra-MsgASizeGroupA (ra-MsgA-SizeGroupA) may be introduced for a data threshold, According to various embodiments, ra-MsgASizeGroupA (ra-MsgA-SizeGroupA) may be defined as shown in Table 16 below.

TABLE 16

| ra-MsgA-SizeGroupA |
| --- |
| Transport block size threshold in bits below which the UE shall use a contention-based RA preamble of group A. (see TS 38.321 [3], clause 5.1.1). |

According to various embodiments, two preamble groups (e.g., group A and group B) in CBRA may be used to indicate the message size.

According to various embodiments, when preamble groups A and B are activated, a preamble group may be aligned with a PUSCH configuration. According to various embodiments, depending on the TB S size for preamble groups A and B, time/frequency resources of different sizes may be allocated for each PUSCH in different PUSCH configurations. According to various embodiments, the UE may select a preamble group and a PUSCH configuration depending on the TBS size to be transmitted.

According to various embodiments, when the network does not operate preamble groups A and B, a preamble group may be used only to indicate a PUSCH configuration. According to various embodiments, since a configured PUSCH resource may have different MCS levels for the same TBS size, the UE may select a preamble group depending on the channel state (e.g., based on RSRP, etc.).

Intra-Slot Frequency Hopping and Guard Band

According to various embodiments, intra-slot hopping (in-slot hopping) may be established without a guard period in a PO.

According to various embodiments, intra-slot hopping may be supported for a MsgA PUSCH.

According to various embodiments, a PRB-level guard-band configuration between frequency division multiplexed (FDMed) POs each consisting of PRB values {0, 1} may be supported.

According to various embodiments, intra-slot hopping per PO for MsgA may be configured based on a configuration per MsgA.

According to various embodiments, the hopping pattern may be based on the Msg3 hopping pattern of REL. 15.

According to various embodiments, a UL-BWP specific parameter may be used.

According to various embodiments, a guard period between hops may or may not be used.

According to various embodiments, POs may be continuous and/or discontinuous in time.

According to various embodiments, an inter-hop guard period may or may not be used. According to various embodiments, the use of a guard period between hops may or may not be allowed.

According to various embodiments, a frequency diversity gain may be obtained from slot hopping.

For example, if a guard time is configured, the duration of the guard time may be required twice within a PO. For example, compared to frequency diversity gain and energy loss, intra-slot hopping may not provide a performance gain. Thus, according to various embodiments, slot hopping may be configured in a PO without any guard periods.

3.3. Mapping for RACH Preamble and PUSCH Resource

RO Mapping/RACH Preamble Configuration for 2-Step RACH

According to various embodiments, an RO may be configured/mapped based on whether RO sharing is allowed between the 2-step RACH procedure and 4-step RACH procedure.

According to various embodiments, for RO separation between the 2-step RACH procedure and 4-step RACH procedure, a configuration for using a subset of ROs in a slot may be allowed.

According to various embodiments, for RO separation between the 2-step RACH procedure and 4-step RACH procedure, a configuration for using an OFDM symbol in a first RACH half slot as an RO may be allowed.

According to various embodiments, a parameter for updating/reconfiguring the value of a parameter configured by a RACH configuration may be introduced. For example, parameters for updating/reconfiguring the number of ROs in a slot, the start OFDM symbol, etc. may be introduced.

For example, ROs may be shared between the 2-step RACH procedure and the 4-step RACH procedure. For example, a PRACH preamble for the 4-step RACH procedure and a PRACH preamble for the 2-step RACH procedure may be separately configured/designated. For example, in both cases where RO sharing is allowed and is not allowed, the PRACH preamble for the 4-step RACH procedure and the PRACH preamble for the 2-step RACH procedure may be separately configured/designated.

For example, if 64 PRACH preambles are allocated for the contention-based RACH procedure, it may be configured/indicated that the first 32 PRACH preambles are PRACH preambles for the 4-step RACH procedure and the last 32 PRACH preambles are PRACH preambles for the 2-step RACH procedure. For example, the corresponding configuration/indication may be based on SIB1 and/or a RACH configuration included in UE-specific RRC signaling.

For example, a PRACH preamble may be understood as a code-domain resource, which may be identified by the root index of the preamble. For example, upon receiving a PRACH preamble, the BS may check whether the corresponding PRACH preamble is a PRACH preamble for the 4-step RACH procedure and/or a PRACH preamble for the 2-step RACH procedure so that the BS may recognize whether the UE transmitting the PRACH preamble desires to initiates the 2-step RACH procedure or the 4-step RACH procedure.

On the other hand, if RO sharing is not allowed (that is, for RO separation), ROs for the 4-step RACH procedure and ROs for the 2-step RACH procedure may be separated. In this case, the BS may recognize based on the corresponding RO whether the UE transmitting a PRACH preamble desires to initiate the 2-step RACH procedure or the 4-step RACH procedure based on the corresponding RO.

According to various embodiments, among PRACH preambles (except for PRACH preamble(s) for the 4-step RACH procedure) within an RO configured for the (contention-based) 4-step RACH procedure, PRACH preamble(s) may be configured for the (contention-based) 2-step RACH procedure. According to various embodiments, the BS may identify the purpose of PRACH transmission (for example, whether the PRACH transmission is for the 2-step RACH procedure or 4-step RACH procedure). According to various embodiments, since PRACH preambles are separated into PRACH preambles for the 2-step RACH procedure and PRACH preambles for the 4-step RACH procedure, the BS may determine based on a PRACH preamble whether PRACH transmission is for the 2-step RACH procedure or 4-step RACH procedure.

According to various embodiments, for RO sharing, a PUSCH in MsgA may be allocated to a PUSCH slot after a RACH slot.

According to various embodiments, when RO sharing is not allowed, an RO for the 2-step RACH procedure may be configured. According to various embodiments, at least one of the following two methods may be considered to configure the RO for the 2-step RACH procedure:

1) Slot level TDM/slot level multiplexing: according to various embodiments, RACH configuration tables for the 4-step RACH procedure may be reused. For example, the RACH configuration tables may be designed on the assumption that most of OFDM symbols in a RACH slot or second RACH half slot are used as an RO. Accordingly, in this case, an RO and a PUSCH may be multiplexed in different slots.
2) Symbol level TDM)/symbol level multiplexing: according to various embodiments, OFDM symbol(s) in a first RACH half slot may be configured to be used as an RO. According to various embodiments, OFDM symbols after the RO may be allocated for a PUSCH of MsgA.

Figure 21:
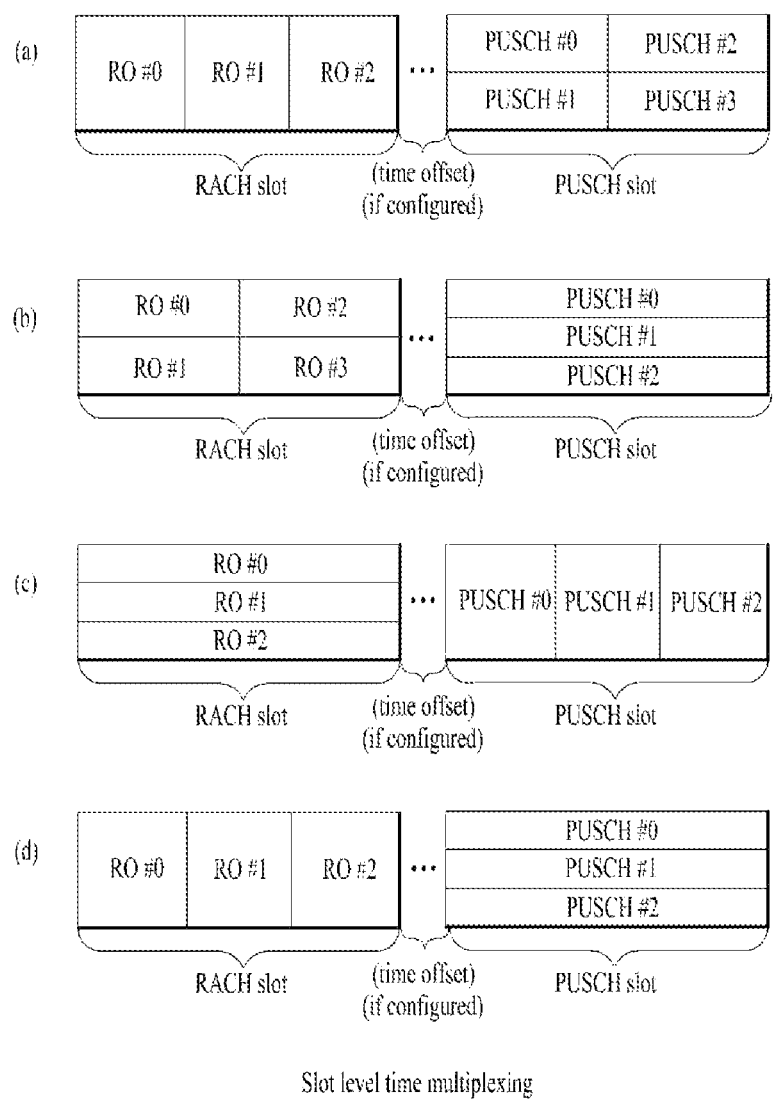
FIG. 21 is a diagram illustrating an exemplary MsgA configuration according to various embodiments.

FIG. 21 is a diagram illustrating an exemplary MsgA configuration according to various embodiments. Specifically, FIG. 21 shows an exemplary method in which an RO for MsgA and a PUSCH for MsgA are multiplexed at the slot level.

Referring to FIG. 21, an RO for transmitting a PRACH preamble included in MsgA and a PO for transmitting a PUSCH included in MsgA may be time division multiplexed (TDMed) at the slot level.

For example, the RO may be included in or mapped to a RACH slot positioned earlier than a PUSCH slot in the time domain In addition, the PO may be included in or mapped to the PUSCH slot positioned after the RACH slot in the time domain.

For example, each of the RO and/or PO may be multiplexed in each slot in various ways.

FIG. 21 (a) illustrates an example in which ROs are TDMed in a RACH slot and PUSCHs are FDMed/TDMed in a PUSCH slot.

FIG. 21(b) illustrates an example in which ROs are FDMed/TDMed in a RACH slot and PUSCHs are FDMed in a PUSCH slot.

FIG. 21(c) illustrates an example in which ROs are FDMed in a RACH slot and PUSCHs are TDMed in a PUSCH slot.

FIG. 21(d) illustrates an example in which ROs are TDMed in a RACH slot and PUSCHs are TDMed/CDMed in a PUSCH slot.

A prescribed time offset may be set between an RO and a PO in the time domain That is, the prescribed time offset may be configured between a RACH slot including the RO and a PUSCH slot including the PO in the time domain.

For example, the corresponding time offset may consist of a predetermined number of slots.

As an opposite example, when no time offset is configured, the RACH slot and the PUSCH slot may be contiguous in the time domain.

Figure 22:
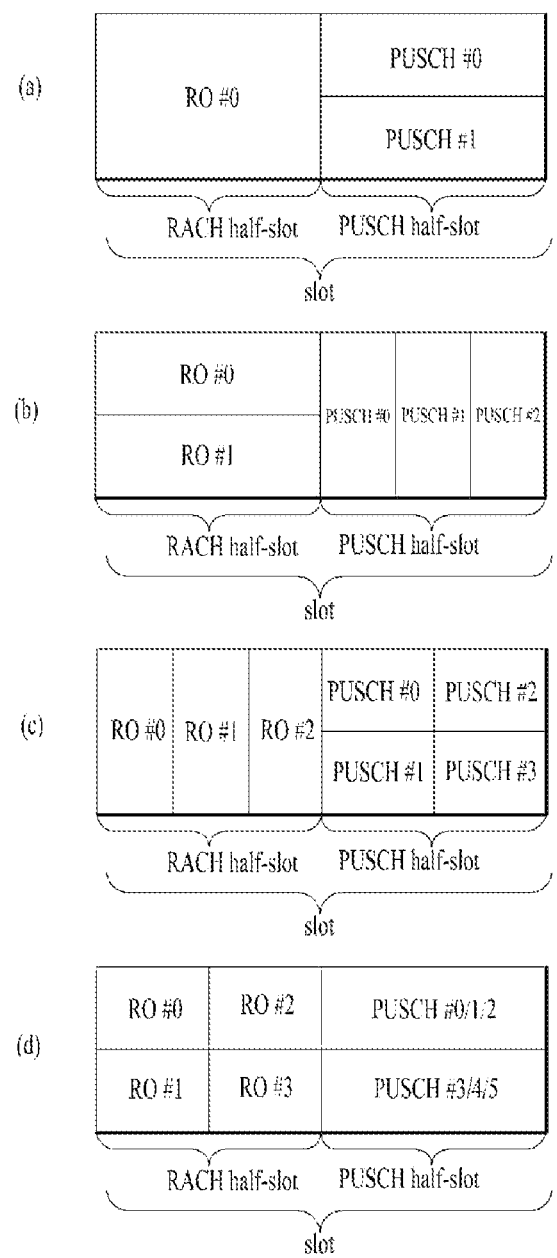
FIG. 22 is a diagram illustrating an exemplary MsgA configuration according to various embodiments.

FIG. 22 is a diagram illustrating an exemplary MsgA configuration according to various embodiments. Specifically, FIG. 22 shows an exemplary method in which an RO for MsgA and a PUSCH for MsgA are multiplexed at the symbol level.

Referring to FIG. 22, an RO for transmitting a PRACH preamble included in MsgA and a PO for transmission a PUSCH included in MsgA may be TDMed at the symbol level For example, the RO and PO may be included in one slot.

For example, the RO may be included in or mapped to a RACH half-slot located earlier than a PUSCH half-slot in the time domain. In addition, the PO may be included in or mapped to the PUSCH half-slot located after the RACH half-slot in the time domain.

For example, the RO may be included in or mapped to one or more OFDM symbols in the RACH half-slot. In addition, the PO may be included in or mapped to one or more OFDM symbols in the PUSCH half-slot.

For example, each of the RO and/or PO may be multiplexed within each half-slot in various ways.

FIG. 22 (a) illustrates an example in which one RO is configured in a RACH half-slot and PUSCHs are FDMed in a PUSCH half-slot.

FIG. 22(b) illustrates an example an example in which ROs are FDMed in a RACH half-slot and PUSCHs are TDMed in a PUSCH half-slot.

FIG. 22(c) illustrates an example an example in which ROs are TDMed in a RACH half-slot and PUSCHs are FDMed/TDMed in a PUSCH half-slot.

FIG. 22(d) illustrates an example an example in which ROs are FDMed/TDMed in a RACH half-slot and PUSCHs are TDMed/CDMed in a PUSCH half-slot.

RACH Preamble-To-PRU Mapping for 2-Step RACH and/or Periodicity Thereof

According to various embodiments, the (RACH preamble-to-PRU) mapping may be defined between a MsgA RO in period A and a MsgA PO in period B.

According to various embodiments, period B may be determined based on an SSB-to-RACH association period. For example, period B has the same duration (length) as period A, but the starting point thereof may be shifted by a single offset of a MsgA PUSCH configuration.

According to various embodiments, period A may be determined based on the SSB-to-RACH association period. For example, since the number of valid MsgA ROs is identified within the SSB-to-RO association period, period A may be the same as the SSB-to-RACH association period.

According to various embodiments, preambles in available/valid ROs of a RACH slot in front of available/valid POs may be mapped to PRUs within the available/valid POs.

According to various embodiments, an association period for SSB-to-RO mapping may be applied to RACH preamble-to-PRU mapping. According to various embodiments, preambles in available/valid ROs in an association period for SSB-to-RO mapping may be mapped to PRUs in an available/valid POs in the association period.

According to various embodiments, a single offset value for indicating the location of a PO group may be allowed. According to various embodiments, if the periodicity of a RACH is the same as that of a PO group, each RACH slot may be mapped to the PO group.

According to various embodiments, a mapping rule between RACH preambles and PRUs may be defined as follows:

0) A validation check which POs are available.
1) Preambles in available ROs of a RACH slot in front of available POs may be mapped to PRUs in the available POs.
2) Preambles in available ROs in period A may be mapped to PRUs in available POs in period B.
   A) (one-to-one mapping) If the number of preambles for CBRA in available ROs in period A is the same as the number of PRUs in available POs in period B, all preambles for CBRA may be mapped to all PRUs.
   B) (many-to-one mapping) If the number of preambles for CBRA in available ROs in period A is greater than the number of PRUs in available POs in period B, all preambles for CBRA may be mapped to all PRUs and/or a subset thereof. When a subset of PRUs is used, the remaining PRUs may not be used for the 2-step RACH procedure.
   C) (one-to-one mapping with multiple cycles) When the number of preambles for CBRA in available ROs in period A is smaller than the number of PRUs in available POs in period B, all preambles for CBRA may be mapped to all PRUs and/or a subset thereof. When a subset of PRUs is used, the remaining PRUs may not be used for the 2-step RACH procedure.
   If a set of (a number of) actually transmitted SSBs (ATSSs) mapped to ROs in an SSB-to-RO association period are not fully mapped with PRUs in available POs in period B, preambles in available ROs may not be mapped to the PRUs in the available POs.

The remaining preambles for the 2-step RACH procedure, which are not mapped to the PRUs, may be used for MsgA preamble only transmission.

In many-to-one mapping, consecutive PRACH preambles (N consecutive PRACH preamble indexes) may be mapped to the same PRU, and then next consecutive PRACH preamble (N consecutive PRACH preamble indexes) may be mapped to the next PRU.

For example, an association period for SS/PBCH block-to-PRACH occasion mapping, which starts from frame 0, may be equivalent to a minimum value in a set determined by a PRACH configuration period according to Table 17.

TABLE 17

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For example, a predetermined number of SS/PBCH blocks obtained from the value of ssb-PositionsInBurst indicating ATSSs included in SIB1 and/or ServingCellConfigCommon (which is an IE used to configure cell-specific parameters of the serving cell of the UE) may be mapped to one or more PRACH occasions within an association period. For example, the predetermined number of SS/PBCH blocks may be cyclically mapped to PRACH occasions a predetermined integer number of times within the association period. For example, an association pattern period may include one or more association periods, and a pattern between PRACH occasions and SS/PBCH indices may be determined to be repeated at most every 160 ms.

For a paired spectrum, all PRACH occasions may be valid.

For an unpaired spectrum:
When the UE is not provided tdd-UL-DL-Configuration-Common, if a PRACH occasion in a PRACH slot does not precede a SS/PBCH block in the PRACH slot and starts at least N symbols after the last SS/PBCH block reception symbol (where N is an integer or natural number), if ChannelAccessMode-r16=semistatic is provided, and if the PRACH occasion in the PRACH slot does not overlap a set of consecutive symbols before the start of a next channel occupancy time where the UE does not perform transmission, the PRACH occasion in the PRACH slot may be valid.

The candidate SS/PBCH block index of the SS/PBCH block may correspond to an SS/PBCH block index provided by ssb-PositionsInBurst.

If the UE is provided tdd-UL-DL-ConfigurationCommon, a PRACH occasion in a PRACH slot may be valid if at least one of the following conditions are satisfied:
If the PRACH occasion in the PRACH slot is within UL symbols; and/or
If the PRACH occasion in the PRACH slot does not precede an SS/PBCH block in the PRACH slot and starts at least N symbols after the last DL symbol (wherein N is an integer or natural number) or starts at least N symbols after the last SS/PBCH block reception symbol (wherein N is an integer or natural number), if ChannelAccessMode-r16=semistatic is provided, and if the PRACH occasion in the PRACH slot does not overlap with a set of consecutive symbols before the start of a next channel occupancy time where no transmission is performed.

The candidate SS/PBCH block index of the SS/PBCH block may correspond to an SS/PBCH block index provided by ssb-PositionsInBurst.

Figure 23:
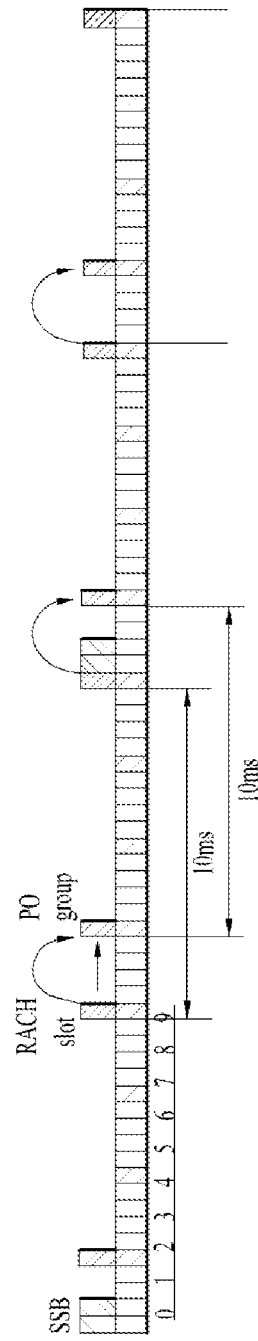
FIG. 23 is a diagram illustrating exemplary time-domain locations for a MsgA RACH and a MsgA physical uplink shared channel (PUSCH) according to various embodiments.

FIG. 23 is a diagram illustrating exemplary time-domain locations for a MsgA RACH and a MsgA PUSCH according to various embodiments.

In FIG. 23, it is assumed that a UL slot is allocated every 2.5 ms and a RACH is configured in a subframe with index 9 within a period of 10 ms. For example, a PO group may be configured with an offset of 2.5 ms and a period of 10 ms.

According to various embodiments, two periods (e.g., association periods and association pattern periods) for SSB-to-RO mapping may be defined due to different number of valid ROs within a RACH period.

According to various embodiments, an SSB-to-RO association period may be determined by comparing the number of SSBs and the number of valid ROs. Since the number of preambles per SSB is the same, the remaining RACH preambles in a mapping period may not be mapped to SSBs.

According to various embodiments, for the 2-step RACH procedure, preamble-to-PRU mapping may be provided in consideration of the equality of the numbers of preambles and PRUs per SSB.

According to various embodiments, for the preamble-to-PRU mapping, it may be considered that timely closed OFDM symbols are assigned for a MsgA preamble and a MsgA PUSCH in order to reduce the latency.

According to various embodiments, when valid MsgA ROs in period A and valid MsgA POs in period B are determined, the preamble-to-PRU mapping may operate.

According to various embodiments, period A may be determined based on an SSB-to-RACH association period. For example, since the number of valid MsgA ROs is identified within an SSB-to-RO association period, period A may be equivalent to the SSB-to-RACH association period.

According to various embodiments, a mapping rule between RACH preambles and PRUs may be defined as follows:
0) A validation check which POs are available.
   A) POs in a flexible/UL slot may be available.
   B) POs after a gap period of N symbols (where N is an integer greater than or equal to 0 or a natural number) from the last DL symbol may be available.
   C) POs that do not collide with an SSB may be available.
1) Preambles in available ROs of a RACH slot in front of available POs may be mapped to PRUs in the available POs.
2) An SSB-to-RO association period may be applied to RACH preamble-to-PRU mapping.
   A) Preambles in available ROs in the association period for SSB-to-RO mapping may be mapped to PRUs in available POs in the association period.
3) If the number of preambles for CBRA in available ROs in the association period is equal to or greater than the number of PRUs in available POs in the association period, all preambles for CBRA or a subset of preambles may be mapped to PRUs in the available POs.
   A) If a set of ATSSs mapped to ROs in an association period for SSB-to-RO mapping are not fully mapped to PRUs in available POs in an SSB association period, preambles in available ROs may not be mapped to available PRUs in the available POs.

B) The remaining preambles for the 2-step RACH procedure, which are not mapped to the PRUs, may be used for MsgA preamble only transmission.

Additionally/alternatively, according to various embodiments, a mapping rule between RACH preambles and PRUs may be defined as follows:
0) A validation check which POs are available.
1) Preambles in available ROs of a RACH slot in front of available POs may be mapped to PRUs in the available POs.
2) Preambles in available ROs in period A may be mapped to PRUs in available POs in period B.
   A) (one-to-one mapping) If the number of preambles for CBRA in available ROs in period A is the same as the number of PRUs in available POs in period B, all preambles for CBRA may be mapped to all PRUs.
   B) (many-to-one mapping) If the number of preambles for CBRA in available ROs in period A is greater than the number of PRUs in available POs in period B, all preambles for CBRA may be mapped to all PRUs and/or a subset thereof. When a subset of PRUs is used, the remaining PRUs may not be used for the 2-step RACH procedure.
   C) (one-to-one mapping with multiple cycles) When the number of preambles for CBRA in available ROs in period A is smaller than the number of PRUs in available POs in period B, all preambles for CBRA may be mapped to all PRUs and/or a subset thereof. When a subset of PRUs is used, the remaining PRUs may not be used for the 2-step RACH procedure.
If a set of (a number of) ATSSs mapped to ROs in an SSB-to-RO association period are not fully mapped with PRUs in available POs in period B, preambles in available ROs may not be mapped to the PRUs in the available POs.
The remaining preambles for the 2-step RACH procedure, which are not mapped to the PRUs, may be used for MsgA preamble only transmission.

In many-to-one mapping, consecutive PRACH preambles (N consecutive PRACH preamble indexes) may be mapped to the same PRU, and then next consecutive PRACH preamble (N consecutive PRACH preamble indexes) may be mapped to the next PRU. That is, each of the N consecutive PRACH preamble indexes of valid PRACH occasions in a PRACH slot may be mapped to one PO (and DMRS resource associated therewith). According to various embodiments, the number N of consecutive PRACH preamble indexes may be determined based on the number of valid PRACH occasions and the number of valid POs.

Figure 24:
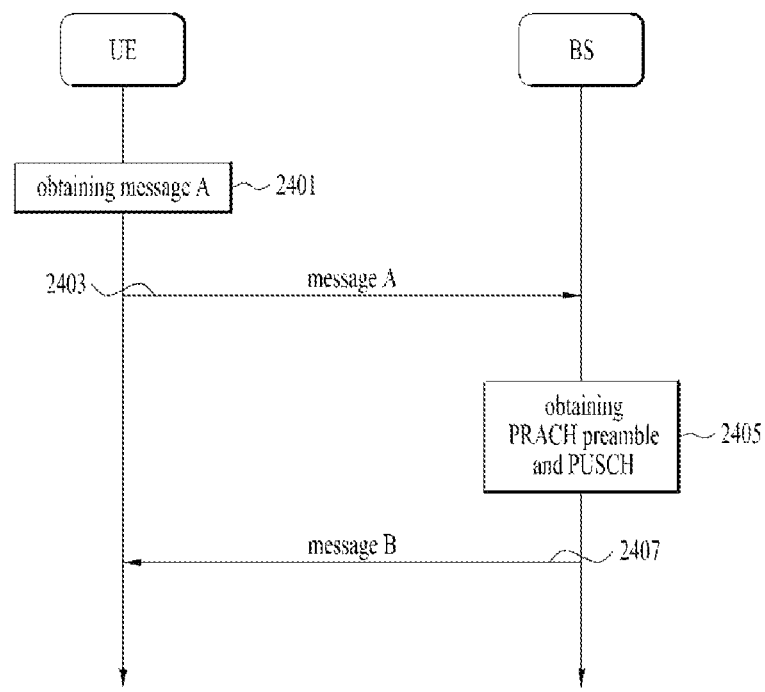
FIG. 24 is a diagram schematically illustrating a method of operating a UE and a BS according to various embodiments.

FIG. 24 is a diagram schematically illustrating a method of operating a UE and a BS according to various embodiments.

Figure 25:
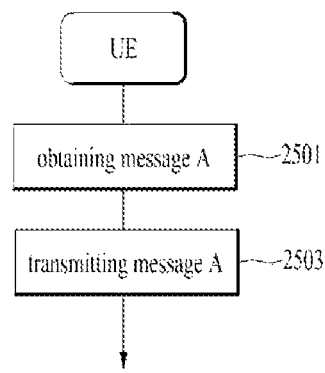
FIG. 25 is a flowchart illustrating a method of operating a UE according to various embodiments.

FIG. 25 is a flowchart illustrating a method of operating a UE according to various embodiments.

Figure 26:
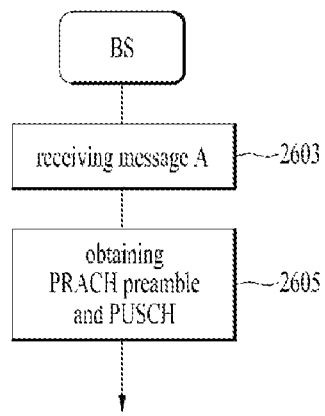
FIG. 26 is a flowchart illustrating a method of operating a BS according to various embodiments.
Figure 27:
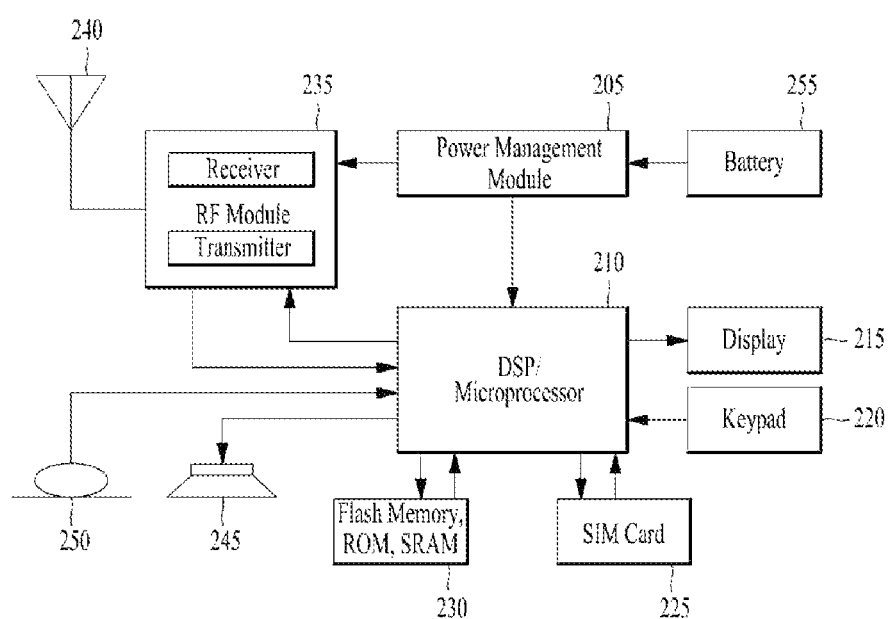
FIG. 27 is a diagram illustrating devices that implement various embodiments of the present disclosure.

FIG. 26 is a flowchart illustrating a method of operating a BS according to various embodiments.

FIGS. 24 to 26, in operations 2401 and 2501 according to various embodiments, the UE may obtain/generate MsgA. According to various embodiments, MsgA may include a PRACH preamble and a PUSCH.

In operations 2403, 2503, and 2603 according to various embodiments, the UE may transmit MsgA, and the BS may receive MsgA.

In operations 2405 and 2605 according to various embodiments, the BS may obtain the PRACH preamble and the PUSCH based on MsgA.

According to various embodiments, the PUSCH may be transmitted/received based on received/transmitted information related to a PUSCH configuration for MsgA.

According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments of the Present Disclosure

4.1. Exemplary Configurations of Devices to which Various Embodiments of the Present Disclosure are Applied FIG. 28 is a diagram illustrating devices that implement various embodiments of the present disclosure.

Figure 28:
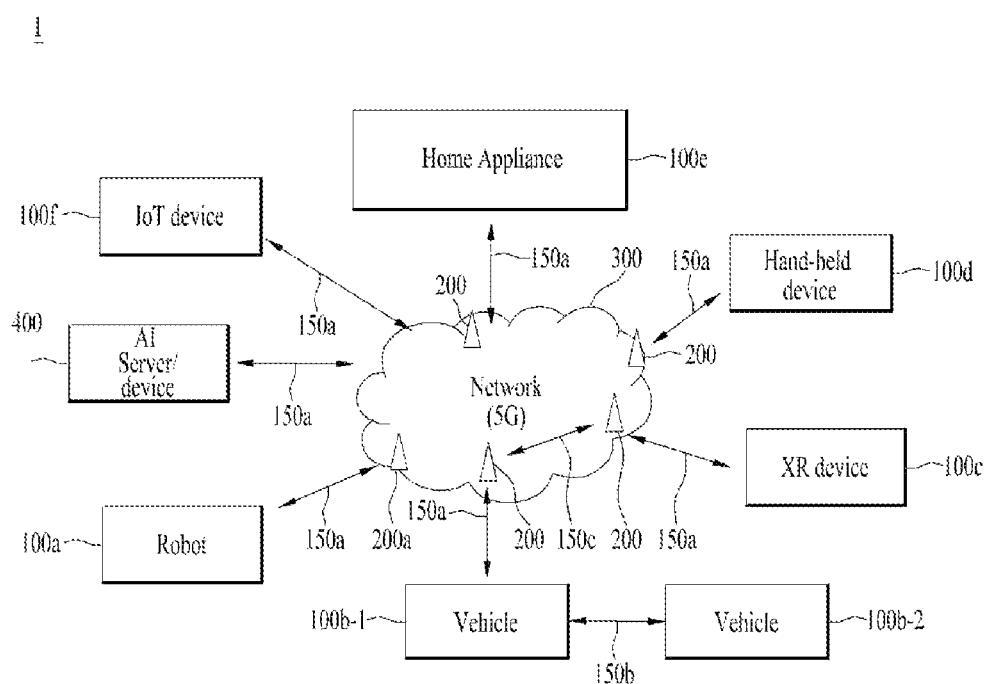
FIG. 28 illustrates an exemplary communication system to which various embodiments of the present disclosure are applied.

The devices illustrated in FIG. 28 may be a UE and/or a BS (e.g., eNB or gNB) adapted to perform the afore-described mechanisms, or any devices performing the same operation.

Referring to FIG. 28, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 28 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 28 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BS (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments, the at least one processor included in the UE (or the at least one processor of the communication device included in the UE) may obtain MsgA including a PRACH preamble and a PUSCH According to various embodiments, the at least one processor included in the UE may transmit MsgA.

According to various embodiments, the PUSCH may be transmitted based on received information related to a PUSCH configuration for the message A, According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

According to various embodiments, the at least one processor included in the BS (or the at least one processor of the communication device included in the BS) may receive MsgA.

According to various embodiments, the at least one processor included in the BS may obtain a PRACH preamble and a PUSCH based on MsgA.

According to various embodiments, the PUSCH may be obtained based on transmitted information related to a PUSCH configuration for the message A, According to various embodiments, based on that the information related to the PUSCH configuration includes information related to indication of a CDM group for a DMRS for the PUSCH, the CDM group may be configured as a group indicated by the information related to the indication of the CDM group of two predetermined groups.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 28 illustrates an exemplary communication system to which various embodiments of the present disclosure are applied.

Referring to FIG. 28, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 29:
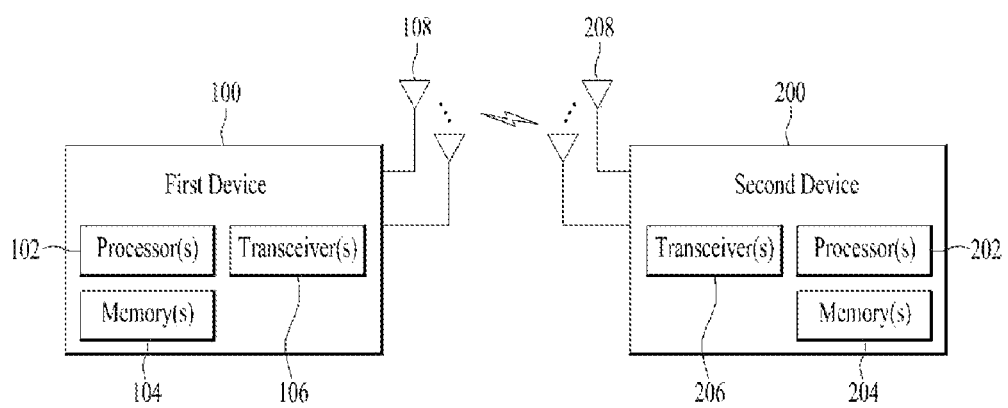
FIG. 29 illustrates exemplary wireless devices to which various embodiments of the present disclosure are applicable.

4.2.1 Example of Wireless Devices to which Various Embodiments of the Present Disclosure are Applied FIG. 29 illustrates exemplary wireless devices to which various embodiments of the present disclosure are applicable.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 30:
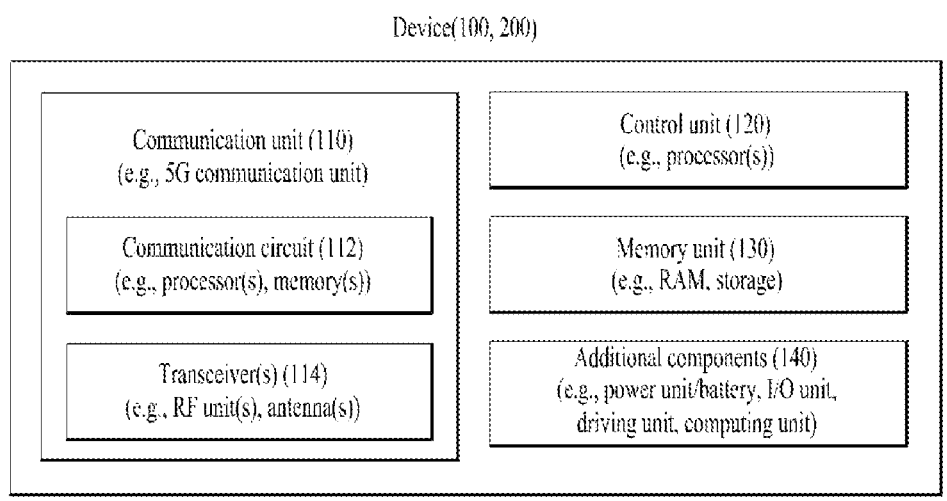
FIG. 30 illustrates other exemplary wireless devices to which various embodiments of the present disclosure are applied.

4.2.2. Example of Using Wireless Devices to which Various Embodiments of the Present Disclosure are Applied FIG. 30 illustrates other exemplary wireless devices to which various embodiments of the present disclosure are applied. The wireless devices may be implemented in various forms according to a use case/service (see FIG. 28).

Referring to FIG. 30, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
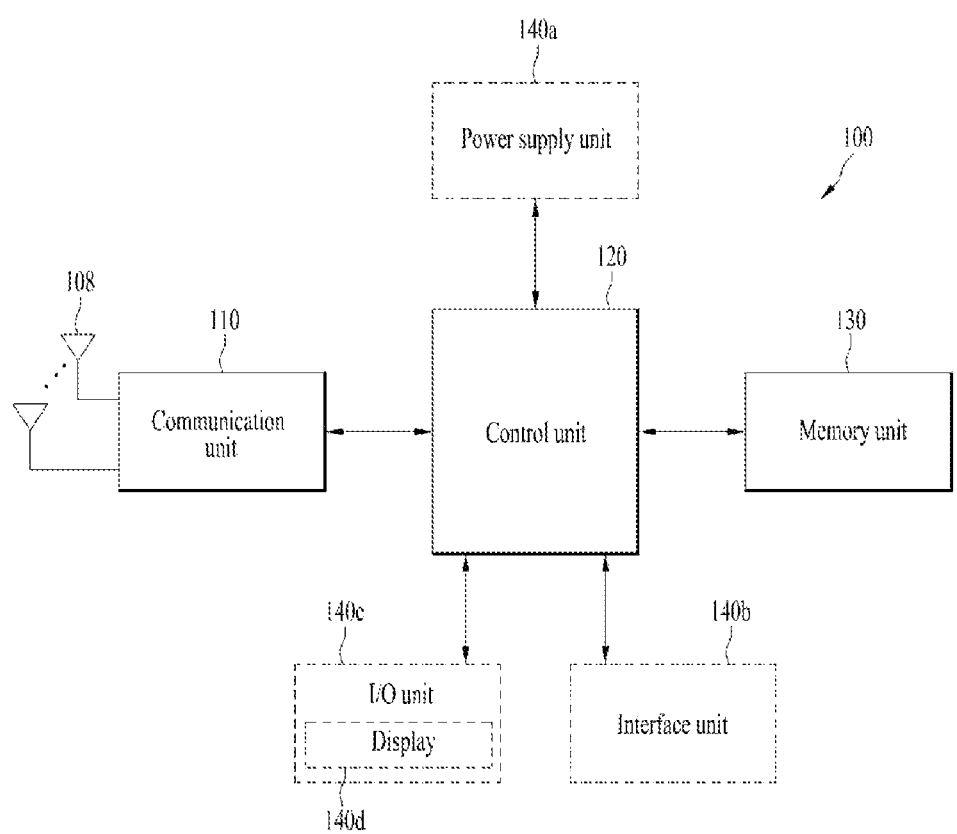
FIG. 31 illustrates an exemplary portable device to which various embodiments of the present disclosure are applied.

4.2.3. Example of Portable Device to which Various Embodiments of the Present Disclosure are Applied FIG. 31 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 31, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 30, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 32:
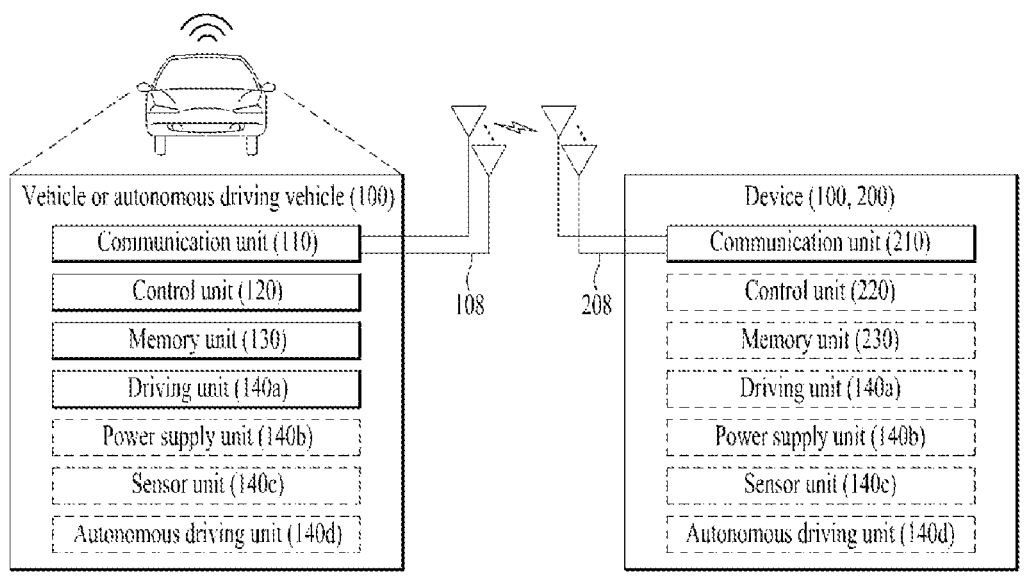
FIG. 32 illustrates an exemplary vehicle or autonomous driving vehicle to which various embodiments of the present disclosure.

4.2.4. Example of Vehicle or Autonomous Driving Vehicle to which Various Embodiments of the Present Disclosure FIG. 32 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 32, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 30, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

A wireless communication technology for implementing various embodiments of the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in a wireless device according to various embodiments of the present disclosure may perform communication based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless device according to various embodiments of the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
transmitting a message A comprising a physical random access channel (PRACH) preamble and a physical uplink shared channel (PUSCH); and
receiving a message B comprising a random access response (RAR),
wherein the PRACH preamble belongs to a first plurality of PRACH preambles which are mapped to a plurality of valid PUSCH occasions,
wherein the PUSCH is transmitted based on physical uplink shared channel (PUSCH) configuration for the message A, and
wherein based on information related to a demodulation reference signal (DM-RS) code division multiplexing (CDM) group of the PUSCH configuration, at least one DM-RS CDM group for the PUSCH is configured among two DM-RS CDM groups.

2. The method of claim 1, wherein a PRACH preamble among a second plurality of PRACH preambles which are not mapped to any one of the plurality of valid PUSCH occasions is available to be transmitted.

3. The method of claim 1, wherein based on the PUSCH configuration comprising the information related to the DM-RS CDM group, the information related to the DM-RS CDM group indicates which one is used for the at least one DM-RS CDM group for the PUSCH among the two DM-RS CDM groups, and
wherein based on the PUSCH configuration not comprising the information related to the DM-RS CDM group, the at least one DM-RS CDM group for the PUSCH is configured as the two DM-RS CDM groups.

4. The method of claim 1, wherein the PUSCH is unable to be transmitted in any of remaining valid PUSCH occasions among the plurality of valid PUSCH occasions except for the at least one valid PUSCH occasion, and
wherein the remaining valid PUSCH occasions are unmapped to any of the plurality of PRACH preambles.

5. An apparatus configured to operate in a wireless communication system, the apparatus comprising:
a memory; and
at least one processor coupled with the memory,
wherein the at least one processor is configured to:
transmit a message A comprising a physical random access channel (PRACH) preamble and a physical uplink shared channel (PUSCH); and
receive a message B comprising a random access response (RAR),
wherein the PRACH preamble belongs to a first plurality of PRACH preambles which are mapped to a plurality of valid PUSCH occasions,
wherein the PUSCH is transmitted based on physical uplink shared channel (PUSCH) configuration for the message A, and
wherein based on information related to a demodulation reference signal (DM-RS) code division multiplexing (CDM) group of the PUSCH configuration, at least one DM-RS CDM group for the PUSCH is configured among two DM-RS CDM groups.

6. The apparatus of claim 5, wherein a PRACH preamble among a second plurality of PRACH preambles which are not mapped to any one of the plurality of valid PUSCH occasions is available to be transmitted.

7. The apparatus of claim 5, wherein based on the PUSCH configuration comprising the information related to the DM-RS CDM group, the information related to the DM-RS CDM group indicates which one is used for the at least one DM-RS CDM group for the PUSCH among the two DM-RS CDM groups, and
wherein based on the PUSCH configuration not comprising the information related to the DM-RS CDM group, the at least one DM-RS CDM group for the PUSCH is configured as the two DM-RS CDM groups.

8. The apparatus of claim 5, wherein the PUSCH is unable to be transmitted in any of remaining valid PUSCH occasions among the plurality of valid PUSCH occasions except for the at least one valid PUSCH occasion, and
wherein the remaining valid PUSCH occasions are unmapped to any of the plurality of PRACH preambles.

9. A method performed by a base station (BS) in a wireless communication system, the method comprising:
receiving a message A comprising a physical random access channel (PRACH) preamble and a physical uplink shared channel (PUSCH); and
transmitting a message B comprising a random access response (RAR),
wherein the PRACH preamble belongs to a first plurality of PRACH preambles which are mapped to a plurality of valid PUSCH occasions,
wherein the PUSCH is received based physical uplink shared channel (PUSCH) configuration for the message A, and
wherein based on information related to a demodulation reference signal (DM-RS) code division multiplexing (CDM) group of the PUSCH configuration, at least one DM-RS CDM group for the PUSCH is configured among two DM-RS CDM groups.

10. The method of claim 9, wherein a PRACH preamble among a second plurality of PRACH preambles which are not mapped to any one of the plurality of valid PUSCH occasions is available to be received.

11. The method of claim 9, wherein based on the PUSCH configuration comprising the information related to the DM-RS CDM group, the information related to the DM-RS CDM group indicates which one is used for the at least one DM-RS CDM group for the PUSCH among the two DM-RS CDM groups, and
wherein based on the PUSCH configuration not comprising the information related to the DM-RS CDM group, the at least one DM-RS CDM group for the PUSCH is configured as the two DM-RS CDM groups.

12. The method of claim 9, wherein the PUSCH is unable to be received in any of remaining valid PUSCH occasions among the plurality of valid PUSCH occasions except for the at least one valid PUSCH occasion, and
wherein the remaining valid PUSCH occasions are unmapped to any of the plurality of PRACH preambles.

13. An apparatus configured to operate in a wireless communication system, the apparatus comprising:
a memory; and
at least one processor coupled with the memory,
wherein the at least one processor is configured to:
receive a message A comprising a physical random access channel (PRACH) preamble and a physical uplink shared channel (PUSCH); and transmit a message B comprising a random access response (RAR), wherein the PRACH preamble belongs to a first plurality of PRACH preambles which are mapped to a plurality of valid PUSCH occasions, wherein the PUSCH is received based on physical uplink shared channel (PUSCH) configuration for the message A, and wherein based on information related to a demodulation reference signal (DM-RS) code division multiplexing (CDM) group of the PUSCH configuration, at least one DM-RS CDM group for the PUSCH is configured among two DM-RS CDM groups.

14. The apparatus of claim 13, wherein a PRACH preamble among a second plurality of PRACH preambles which are not mapped to any one of the plurality of valid PUSCH occasions is available to be received.

15. The apparatus of claim 13, wherein based on the PUSCH configuration comprising the information related to the DM-RS CDM group, the information related to the DM-RS CDM group indicates which one is used for the at least one DM-RS CDM group for the PUSCH among the two DM-RS CDM groups, and wherein based on the PUSCH configuration not comprising the information related to the DM-RS CDM group, the at least one DM-RS CDM group for the PUSCH is configured as the two DM-RS CDM groups.

16. The apparatus of claim 13, wherein the PUSCH is unable to be received in any of remaining valid PUSCH occasions among the plurality of valid PUSCH occasions except for the at least one valid PUSCH occasion, and wherein the remaining valid PUSCH occasions are unmapped to any of the plurality of PRACH preambles.

* * * * *